US011112731B2

United States Patent
Kawashima et al.

(10) Patent No.: US 11,112,731 B2
(45) Date of Patent: Sep. 7, 2021

(54) DEVELOPER CONTAINER, DEVELOPING DEVICE, AND IMAGE FORMING APPARATUS

(71) Applicant: Ricoh Company, Ltd., Tokyo (JP)

(72) Inventors: Naohiro Kawashima, Kanagawa (JP); Yoshihiro Fujiwara, Kanagawa (JP); Yuki Oshikawa, Kanagawa (JP); Yuuki Tsuchiya, Tokyo (JP); Ryusuke Mase, Kanagawa (JP); Tsutomu Iwata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/691,710

(22) Filed: Nov. 22, 2019

(65) Prior Publication Data

US 2020/0174400 A1    Jun. 4, 2020

(30) Foreign Application Priority Data

Nov. 30, 2018   (JP) .............................. JP2018-224666

(51) Int. Cl.
    *G03G 15/08*    (2006.01)
    *B29C 65/48*    (2006.01)
    *G03G 21/18*    (2006.01)

(52) U.S. Cl.
    CPC ......... *G03G 15/0898* (2013.01); *B29C 65/48* (2013.01); *G03G 15/0865* (2013.01); *G03G 15/0896* (2013.01); *G03G 21/1821* (2013.01); *G03G 2215/0872* (2013.01)

(58) Field of Classification Search
    CPC ........... G03G 15/0894; G03G 15/0896; G03G 21/1676; G03G 21/181; G03G 21/1821; G03G 2215/0855; G03G 2215/0872; G03G 2221/163; G03G 2221/1651; G03G 2221/1876; B29C 65/48
    USPC .......................... 399/113, 119, 411; 156/295
    See application file for complete search history.

(56) References Cited

U.S. PATENT DOCUMENTS

| | | | | |
|---|---|---|---|---|
| 6,246,853 B1 * | 6/2001 | Suzuki | ............... | G03G 15/0896 399/111 |
| 6,439,649 B1 * | 8/2002 | Lorenzo | ............... | B62D 29/043 296/181.3 |
| 7,266,326 B2 * | 9/2007 | Karakama | .......... | G03G 15/0894 399/109 |
| 7,366,439 B2 * | 4/2008 | Anan | ................... | G03G 21/181 399/109 |

(Continued)

FOREIGN PATENT DOCUMENTS

| | | | |
|---|---|---|---|
| JP | 2002372843 A | * | 12/2002 |
| JP | 2003-029531 | | 1/2003 |

(Continued)

Primary Examiner — Robert B Beatty
(74) Attorney, Agent, or Firm — Xsensus LLP

(57) ABSTRACT

A developer container includes a plurality of components combined together to form a space to store a developer. The plurality of components includes a first component and a second component. The developer container further includes a sealant to bond the first component and the second component, and a position regulator to regulate relative positions of the first component and the second component so as to maintain a distance between an adhesion portion of the first component and an adhesion portion of the second component.

20 Claims, 15 Drawing Sheets

(56) References Cited

U.S. PATENT DOCUMENTS

| | | | |
|---|---|---|---|
| 9,069,279 B2 * | 6/2015 | Iwai | G02B 26/12 |
| 9,280,131 B2 * | 3/2016 | Nakazawa | G03G 21/1676 |
| 2002/0159788 A1 * | 10/2002 | Miyabe | G03G 21/181 |
| | | | 399/109 |
| 2006/0144014 A1 * | 7/2006 | Yoon | B29C 66/1122 |
| | | | 52/784.1 |
| 2008/0196831 A1 * | 8/2008 | Friese | C09J 5/10 |
| | | | 156/295 |
| 2017/0293257 A1 | 10/2017 | Ohhira et al. | |
| 2017/0351195 A1 | 12/2017 | Koshizuka et al. | |
| 2018/0136586 A1 | 5/2018 | Tsuchiya et al. | |
| 2018/0143568 A1 | 5/2018 | Ohhira et al. | |
| 2018/0361706 A1 * | 12/2018 | Awano | B29C 66/7212 |
| 2019/0018343 A1 | 1/2019 | Oshikawa | |

FOREIGN PATENT DOCUMENTS

| | | |
|---|---|---|
| JP | 2003-131481 | 5/2003 |
| JP | 2010-039358 | 2/2010 |
| JP | 2014-089337 | 5/2014 |

\* cited by examiner

DEVELOPER CONTAINER, DEVELOPING DEVICE, AND IMAGE FORMING APPARATUS

CROSS-REFERENCE TO RELATED APPLICATION

This patent application is based on and claims priority pursuant to 35 U.S.C. § 119(a) to Japanese Patent Application No. 2018-224666, filed on Nov. 30, 2018, in the Japan Patent Office, the entire disclosure of which is hereby incorporated by reference herein.

BACKGROUND

Technical Field

Embodiments of the present disclosure generally relate to a developer container, a developing device, and an image forming apparatus.

Description of the Related Art

Some developer containers include a plurality of components that are combined together to form a space in which a developer is stored. In the developer container, a sealant bonds the components and forms seals between the components.

SUMMARY

Embodiments of the present disclosure describe an improved developer container that includes a plurality of components combined together to form a space to store a developer. The plurality of components includes a first component and a second component. The developer container further includes a sealant to bond the first component and the second component, and a position regulator to regulate relative positions of the first component and the second component so as to maintain a distance between an adhesion portion of the first component and an adhesion portion of the second component.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
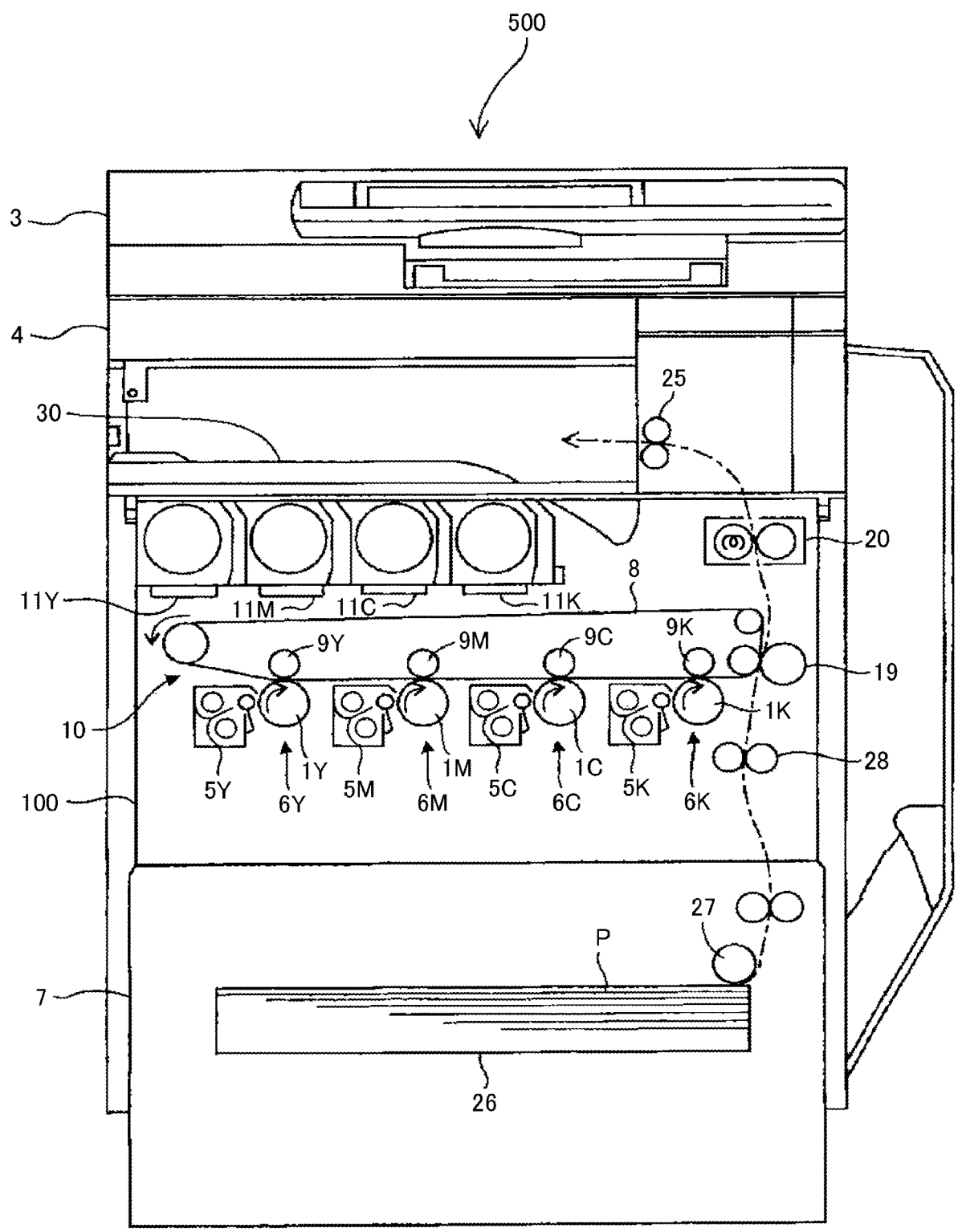
FIG. 1 is a schematic view illustrating a configuration of a copier as an example of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

An image forming apparatus according to an embodiment of the present disclosure is described below. For example, the image forming apparatus in the present embodiment is a tandem-type multicolor copier 500 (hereinafter, simply referred to as "the copier 500").

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

FIG. 1 is a schematic view illustrating a configuration of the copier 500. The copier 500 includes a printer section 100 as a part of the image forming apparatus to form images, a scanner (document reading unit) 4 and a document feeder 3 above a printer section 100, and a sheet feeding unit 7 below the printer section 100. The document feeder 3 feeds documents to the scanner 4, and the scanner 4 scans image data for the documents. The sheet feeding unit 7 includes a sheet tray 26 to accommodate transfer sheets P as recording media and a sheet feeding roller 27 to feed the transfer sheets P from the sheet tray 26 to the printer section 100. It is to be noted that alternate long and short dash line illustrated in FIG. 1 represents a conveyance path through which the transfer sheet P is transported inside the copier 500.

An upper portion of the printer section 100 is an output tray 30 on which transfer sheets P bearing output images are stacked. The printer section 100 includes four image forming units 6Y, 6M, 6C, and 6K for forming yellow, magenta, cyan, and black toner images, respectively, and an intermediate transfer unit 10. The image forming units 6Y, 6M, 6C, and 6K include drum-shaped photoconductors 1Y, 1M, 1C, and 1K as image bearers on which toner images of respective colors are formed, and developing devices 5Y, 5M, 5C, and 5K to develop electrostatic latent images on the photoconductors 1Y, 1M, 1C, and 1K, respectively.

The intermediate transfer unit 10 includes an intermediate transfer belt 8 and primary-transfer bias rollers 9Y, 9M, 9C, and 9K. The intermediate transfer belt 8 serves as an intermediate transferor onto which the toner images are transferred from the respective photoconductors 1Y, 1M, 1C, and 1K, and the toner images are superimposed thereon, thus forming a multicolor toner image. The primary-transfer bias rollers 9Y, 9M, 9C, and 9K transfer the toner images from the photoconductors 1Y, 1M, 1C, and 1K, respectively, onto the intermediate transfer belt 8.

The printer section 100 includes a secondary-transfer bias roller 19 to transfer the multicolor toner image on the intermediate transfer belt 8 onto the transfer sheet P. Further, the printer section 100 includes a registration roller pair 28 to adjust the timing to transport the transfer sheet P fed by the sheet feeding roller 27 to a secondary transfer nip between the intermediate transfer belt 8 and the secondary-transfer bias roller 19. The printer section 100 further includes a fixing device 20 disposed above the secondary transfer nip to fix the unfixed toner image on the transfer sheet P.

Toner containers 11Y, 11M, 11C, and 11K for respective colors are disposed below the output tray 30 of the printer section 100 and above the intermediate transfer unit 10. The toner containers 11Y, 11M, 11C, and 11K contain yellow, magenta, cyan, and black toners to be supplied to the developing devices 5Y, 5M, 5C, and 5K, respectively.

Figure 2:
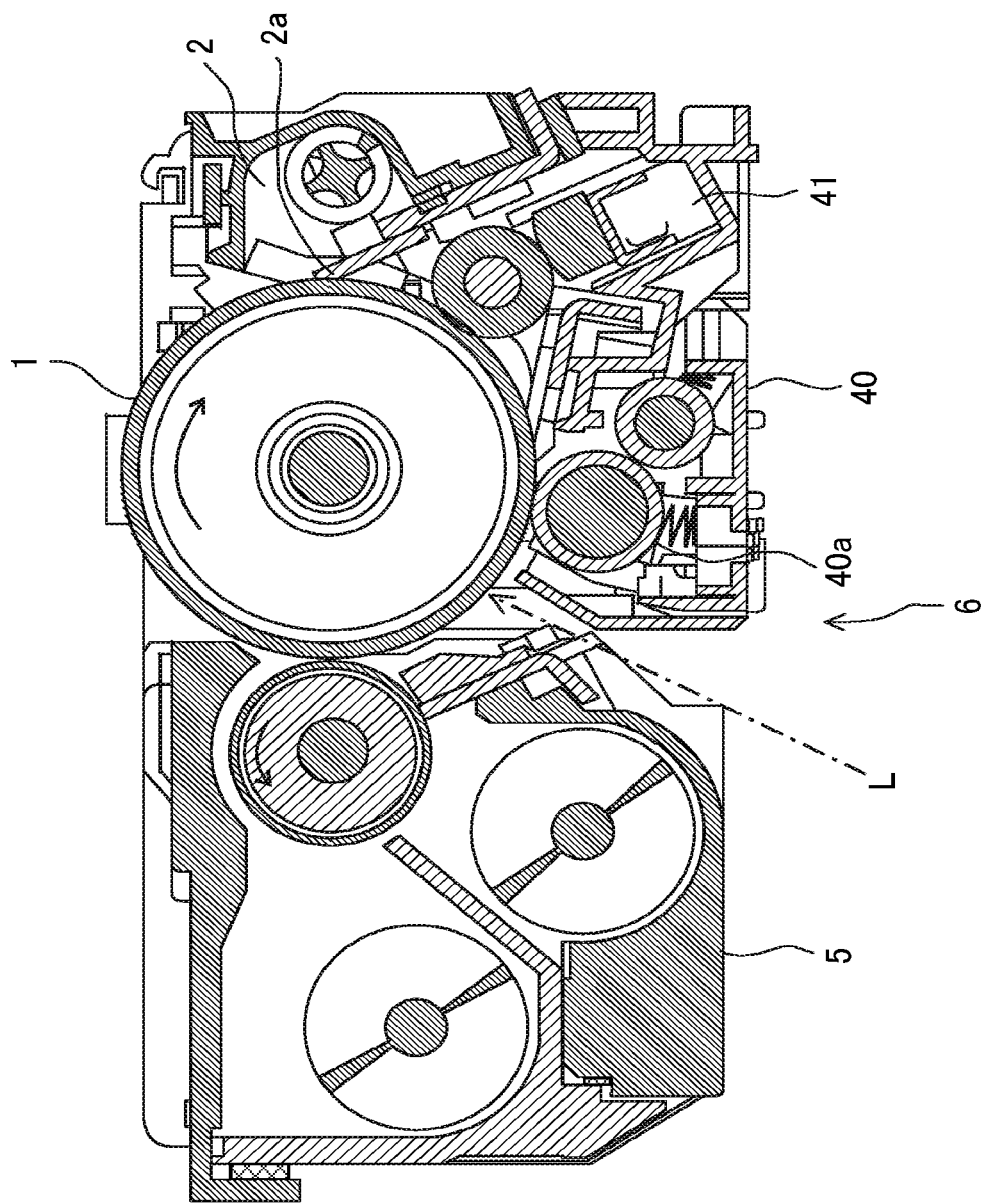
FIG. 2 is a schematic view of one of four image forming units of the image forming apparatus in FIG. 1.

FIG. 2 is an enlarged schematic view of one of the four image forming units 6Y, 6M, 6C, and 6K to which the present disclosure can be applied. The four image forming units 6Y, 6M, 6C, and 6K have a similar configuration except for the color of toner used therein, and hereinafter the suffixes Y, M, C, and K may be omitted when color discrimination is not necessary.

In the configuration illustrated in FIG. 2, the image forming unit 6 includes a common unit housing to support the photoconductor 1 and the developing device 5 as a single unit (i.e., process cartridge) removably installable in the copier 500. Additionally, the image forming unit 6 includes a cleaning device 2, a charging device 40, and a lubrication device 41 positioned around the photoconductor 1 in addition to the developing device 5. In the image forming unit 6 according to the present embodiment, the cleaning device 2 cleans the photoconductor 1 with a cleaning blade 2a, and the charging device 40 charges the surface of the photoconductor 1 with a charging roller 40a.

Operations of the copier 500 according to the present embodiment to form multicolor images are described below.

When a start button is pressed with documents set on a document table of the document feeder 3, conveyance rollers provided in the document feeder 3 transport the documents from the document table onto a platen (exposure glass) of the scanner 4. Then, the scanner 4 optically scans image data for the document on the platen.

Specifically, the scanner 4 scans an image for the document on the platen with light emitted from an illumination lamp. The light reflected from the surface of the document is directed onto a color sensor via mirrors and lenses to form multicolor image data. The multicolor image data for the document, which is decomposed into red, green, and blue (RGB) data, is read by the color sensor and converted into electrical image signals. Further, an image processor performs image processing (e.g., color conversion, color calibration, and spatial frequency adjustment) according to the image signals of the decomposed RGB data, and thus image data for yellow, magenta, cyan, and black toner images are obtained.

The image data for yellow, magenta, cyan, and black toner images are transmitted to a writing device. Then, the writing device directs laser beams L onto the respective photoconductors 1 according to image data of respective colors.

Meanwhile, the four photoconductors 1 rotate clockwise in FIGS. 1 and 2. The surface of the photoconductor 1 is charged uniformly at a position opposite the charging roller 40a of the charging device 40 (charging process). Thus, the surface of the photoconductor 1 is charged to a certain potential. Subsequently, the surface of the photoconductor 1 thus charged reaches a position where the surface is irradiated with the laser beam L.

The writing device emits the laser beam L from each of four light sources according to the image data. The respective laser beams L pass through different optical paths for components of yellow, magenta, cyan, and black, and the surfaces of the photoconductors 1 are irradiated with the respective laser beams L (exposure process).

The laser beam L for the yellow component is directed to the photoconductor 1Y that is the first from the left in FIG. 1 among the four photoconductors 1. A polygon mirror that rotates at high speed deflects the laser beam L for yellow in an axial direction of rotation of the photoconductor 1Y (main scanning direction) so that the laser beam L scans the surface of the photoconductor 1Y. Thus, an electrostatic latent image for yellow is formed on the photoconductor 1Y charged by the charging device 40.

Similarly, the laser beam L for the magenta component is directed to the surface of the photoconductor 1M that is the second from the left in FIG. 1, thus forming an electrostatic latent image for magenta thereon. The laser beam L for the cyan component is directed to the surface of the photoconductor 1C that is the third from the left in FIG. 1, thus forming an electrostatic latent image for cyan thereon. The laser beam L for the black component is directed to the surface of the photoconductor 1K that is the fourth from the left in FIG. 1, thus forming an electrostatic latent image for black thereon.

Then, the surfaces of the photoconductors 1 having the respective electrostatic latent images reach positions opposite the corresponding developing devices 5. The developing device 5 contains a developer including toner and carrier and supplies toner to the surface of the photoconductor 1, thereby developing the latent image thereon into a single-color toner image (developing process).

After passing through the positions opposite the developing devices 5, the surfaces of the respective photoconductors 1 reach positions facing the intermediate transfer belt 8. The respective primary-transfer bias rollers 9 contact an inner circumferential surface of the intermediate transfer belt 8. The respective primary-transfer bias rollers 9 are opposed to the corresponding photoconductors 1 via the intermediate transfer belt 8, thereby forming primary transfer nips where the single-color toner images are transferred from the respective photoconductors 1 and superimposed onto the intermediate transfer belt 8 (primary transfer process).

After passing through the primary transfer nip, the surface of the photoconductor 1 reaches a position opposite the cleaning device 2, where the cleaning blade 2a scraps off and collect the untransferred toner remaining on the photoconductor 1 (cleaning process).

After passing through the position opposite the cleaning device 2, the surface of each photoconductor 1 passes through a discharge device, and electrical potentials remaining on the surface of the photoconductor 1 are removed to complete a sequence of image forming processes performed on the photoconductor 1 and prepare subsequent image formation.

Meanwhile, the intermediate transfer belt 8 carrying the superimposed single-color toner images (multicolor toner image) transferred from the four photoconductors 1 rotates counterclockwise in FIG. 1 and reaches a secondary transfer nip opposite the secondary-transfer bias roller 19.

The sheet feeding roller 27 sends out the transfer sheet P from the sheet tray 26, and the transfer sheet P is then guided by a sheet guide to the registration roller pair 28. The transfer sheet P is caught in the nip of the registration roller pair 28 and temporarily stopped. Then, the registration roller pair 28 forward the transfer sheet P to the secondary transfer nip, timed to coincide with the arrival of the multicolor toner image on the intermediate transfer belt 8.

In the secondary transfer nip, the multicolor toner image on the intermediate transfer belt 8 is transferred onto the sheet P (secondary transfer process).

Subsequently, the intermediate transfer belt 8 reaches a position opposite a belt cleaning device. The belt cleaning device collects residual toner adhering to the intermediate transfer belt 8 to complete a series of transfer processes on the intermediate transfer belt 8.

Excess toner scraped off by the cleaning blade 2a from the surface of the photoconductor 1 is transported through a toner collection path and collected in an excess toner receptacle. In addition, excess toner (including toner forming a pattern for process control) removed by the belt cleaning device from the intermediate transfer belt 8 is transported through the toner collection path and collected in the excess toner receptacle.

The transfer sheet P to which the multicolor toner image is transferred at the secondary transfer nip is guided to the fixing device 20. In the fixing device 20, a fixing belt and a pressure roller are pressed against each other, forming a fixing nip, where the toner image is fixed on the transfer sheet P with heat and pressure.

After passing through the fixing device 20, the transfer sheet P is ejected by an output roller pair 25 to the outside of the printer section 100 as an output image and stacked on the output tray 30 to complete a sequence of image forming processes.

Figure 3:
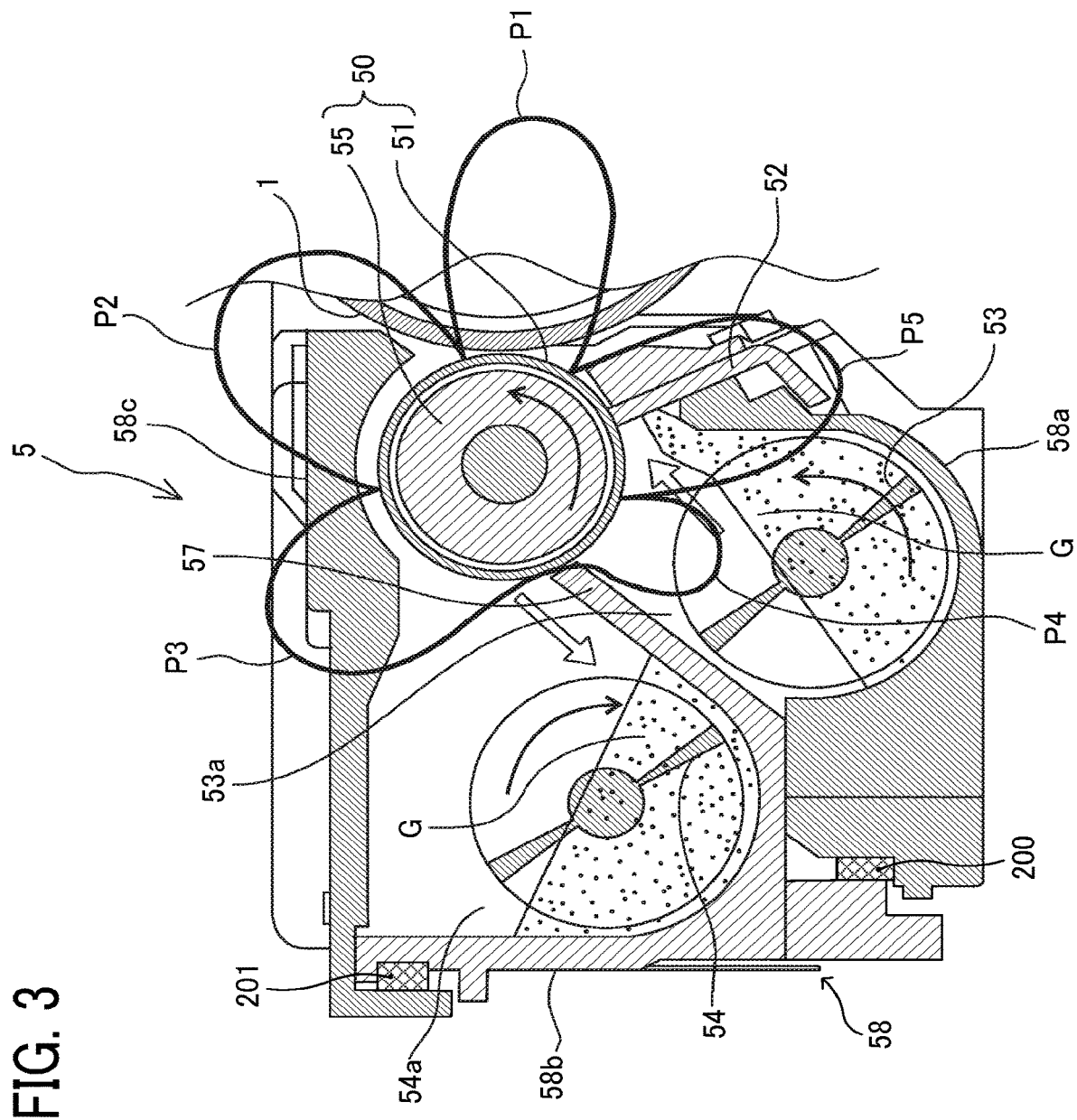
FIG. 3 is a cross-sectional (end-on) view of a developing device of the image forming unit in FIG. 2.
Figure 4:
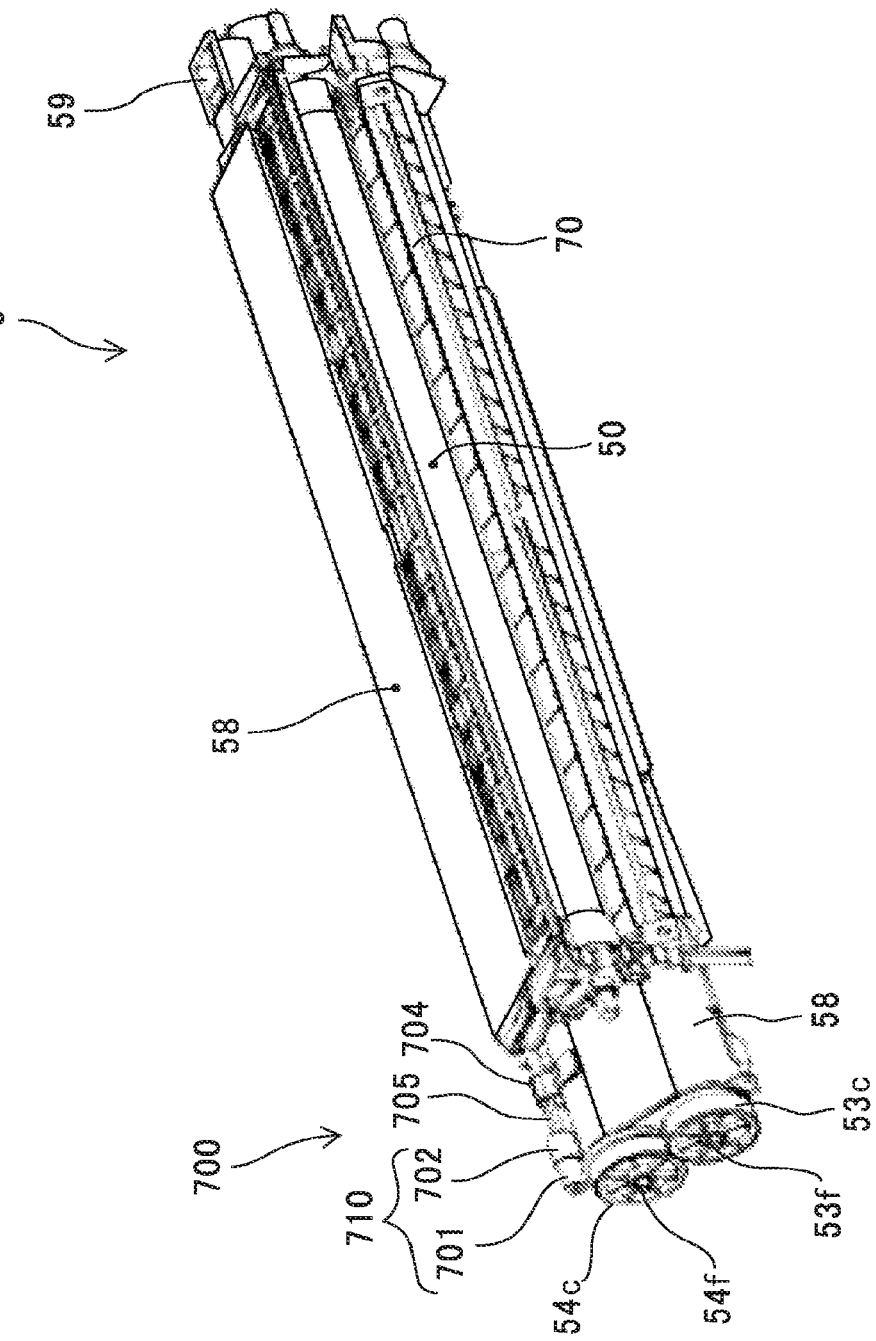
FIG. 4 is a perspective view of the developing device in FIG. 3.

FIG. 3 is a cross-sectional (end-on) view of the developing device 5 according to the present embodiment, and FIG. 4 is a perspective view of the developing device 5 according to the present embodiment.

The developing device 5 includes a casing 58 as a developer container to contain a developer. The casing 58 includes a lower case 58a, an upper case 58b, and a cover 58c as a plurality of components to form a space to store the developer. The developing device 5 further includes a developing roller 50 serving as a developer bearer disposed opposite the photoconductor 1, developer conveyors, namely, a supply screw 53 and a collecting screw 54, a doctor blade 52 serving as a developer regulator, and a partition 57 in the casing 58. Each of the supply screw 53 and the collecting screw 54 includes a rotation shaft and a helical blade wound around the rotation shaft to transport, by rotation, the developer in an axial direction thereof. Additionally, an entrance seal may be provided between the development range and the doctor blade 52 opposite the developing roller 50 to prevent toner from scattering.

The partition 57 divides, at least partly, an interior of the casing 58 of the developing device 5 into a supply channel 53a in which the supply screw 53 is disposed and a collecting channel 54a in which the collecting screw 54 is disposed. Further, on the cross section (illustrated in FIG. 3) perpendicular to the axial direction, an end face of the partition 57 is opposed to the developing roller 50 and positioned adjacent to the developing roller 50. Thus, the partition 57 can also serve as a separator to facilitate separation of developer G from a surface of the developing roller 50. The partition 57 functioning as the separator can inhibit the developer G that has passed through the development range, carried on the developing roller 50, from reaching the supply channel 53a. Thus, developer G is not retained but can move to the collecting channel 54a.

The developing roller 50 includes a magnet roller 55 including multiple magnets secured in the developing roller 50 and a developing sleeve 51 that rotates around the magnet roller 55. The developing sleeve 51 contains the magnet roller 55 and is a rotatable, cylindrical member made of a nonmagnetic material. In the present embodiment, the magnet roller 55 has five magnetic poles, first through fifth poles P1 through P5. The first, third, and fourth poles P1, P3, and P4 are north (N) poles, and the second and fifth poles P2 and P5 are south (S) poles, for example. It is to be noted that bold petal-like lines with reference characters P1 through P5 in FIG. 3 represent density distribution (in absolute value) of magnetic flux generated by the respective magnetic poles on the developing sleeve 51 in a direction normal to the surface of the developing sleeve 51.

The developing device 5 contains a two-component developer including toner and carrier (one or more additives may be included). The supply screw 53 and the collecting screw 54 as the developer conveyors transport the developer G in the longitudinal direction (axial direction of the developing sleeve 51), and thus the circulation channel is established inside the developing device 5. In the developing device 5, the supply screw 53 and the collecting screw 54 are arranged vertically, and the supply channel 53a and the collecting channel 54a are formed with the partition 57 disposed between the supply screw 53 and the collecting screw 54.

The developer G is borne on the developing sleeve 51 upstream in the direction of rotation of the developing sleeve 51 from the development range, where the developing sleeve 51 is opposed to the photoconductor 1. Then, the developer is transported to the development range. The doctor blade 52 is disposed below the developing roller 50 to regulate an amount of developer transported to the development range.

Since the developing device 5 uses the two-component developer G, toner is supplied through a toner supply inlet 59 disposed in the developing device 5 to the developing device 5 in response to the amount of toner consumed in the developing device 5.

Next, supply of fresh toner to the developing device 5 is described in further detail below. A toner supply device supplies fresh toner contained in the toner container 11 to a toner hopper disposed on the rear side of the copier 500 in FIG. 1, and the toner hopper stores the supplied fresh toner. When a toner density sensor disposed inside the developing device 5 determines that the density of toner inside the developing device 5 falls to or below a threshold, a toner supply screw inside the toner hopper is rotated. At that time, the toner supply screw is rotated for a period calculated using a predetermined conversion formula, and a proper amount of toner is supplied from the toner hopper to the developing device 5 through the toner supply inlet 59.

A toner sensor is disposed inside the toner hopper to detect the presence of toner. When the toner sensor determines that no (or little) toner is present, a controller requests the toner supply device to supply toner.

In response to this request, the toner supply device supplies the toner hopper with toner. When the toner sensor detects the presence of toner, the toner supply device stops supplying toner. If the toner sensor does not detect the presence of toner even though the controller requests toner supply for a predetermined period, the controller determines that toner is not present in the toner container 11 (i.e., toner depletion). Thus, the toner sensor can detect that the toner container 11 is empty or almost empty.

While being transported, toner supplied through the toner supply inlet 59 is stirred and mixed with developer G in the developing device 5 by the collecting screw 54 and the supply screw 53 as the developer conveyors. The developer G stirred by the developer conveyors is partly supplied to the surface of the developing sleeve 51 serving as the developer bearer and carried thereon. When the developer G carried on the developing sleeve 51 reaches a position opposite the doctor blade 52 disposed below the developing sleeve 51, an amount of the developer G on the developing sleeve 51 is regulated to a suitable amount by the doctor blade 52, after which the developer G is transported to the development range. In the development range, the toner in developer G on the developing sleeve 51 adheres to the latent image on the surface of the photoconductor 1, thereby developing the latent image. The multiple magnets of the magnet roller 55 secured inside the developing sleeve 51 of the developing roller 50 have the multiple magnetic poles P1 through P5 for forming magnetic fields around the developing sleeve 51.

The developing device 5 according to the present embodiment is filled with 300 g of developer G in which toner, including polyester resin as a main ingredient, and magnetic carrier are mixed together and uniformly distributed. For example, the toner has an average particle diameter of about 5.8 µm, the magnetic carrier has an average particle diameter of about 35 µm, and the concentration of toner in developer G is about 7% by weight. The supply screw 53 and the collecting screw 54 arranged in parallel rotate at 600 revolutions per minute (rpm) to transport the developer G and simultaneously stir the developer G with fresh toner supplied through the toner supply inlet 59. Thus, the toner and carrier are mixed together uniformly, and the toner is triboelectrically charged.

While being transported by the supply screw 53 positioned adjacent to and in parallel to the developing sleeve 51, the developer G in which toner and carrier are mixed together uniformly is attracted by the fifth pole P5 of the magnet roller 55 inside the developing sleeve 51 and carried on an outer circumferential surface of the developing sleeve 51. The developer G carried on the developing sleeve 51 is transported to the development range as the developing sleeve 51 rotates counterclockwise as indicated by the arrow illustrated in FIG. 3. A developing voltage is applied to the developing sleeve 51 by a high voltage power source, and thus a developing electric field is generated between the developing sleeve 51 and the photoconductor 1 in the development range. With the developing electric field, the toner in developer G on the developing sleeve 51 is deposited on the latent image on the surface of the photoconductor 1, thereby developing the latent image on the photoconductor 1.

The developer G on the developing sleeve 51 that has passed through the development range is collected in the collecting channel 54*a* inside the developing device 5 as the developing sleeve 51 rotates. Specifically, the developer G falls from the developing sleeve 51 to an upper face of the partition 57, slides down the partition 57, and then is collected by the collecting screw 54.

Figure 5:
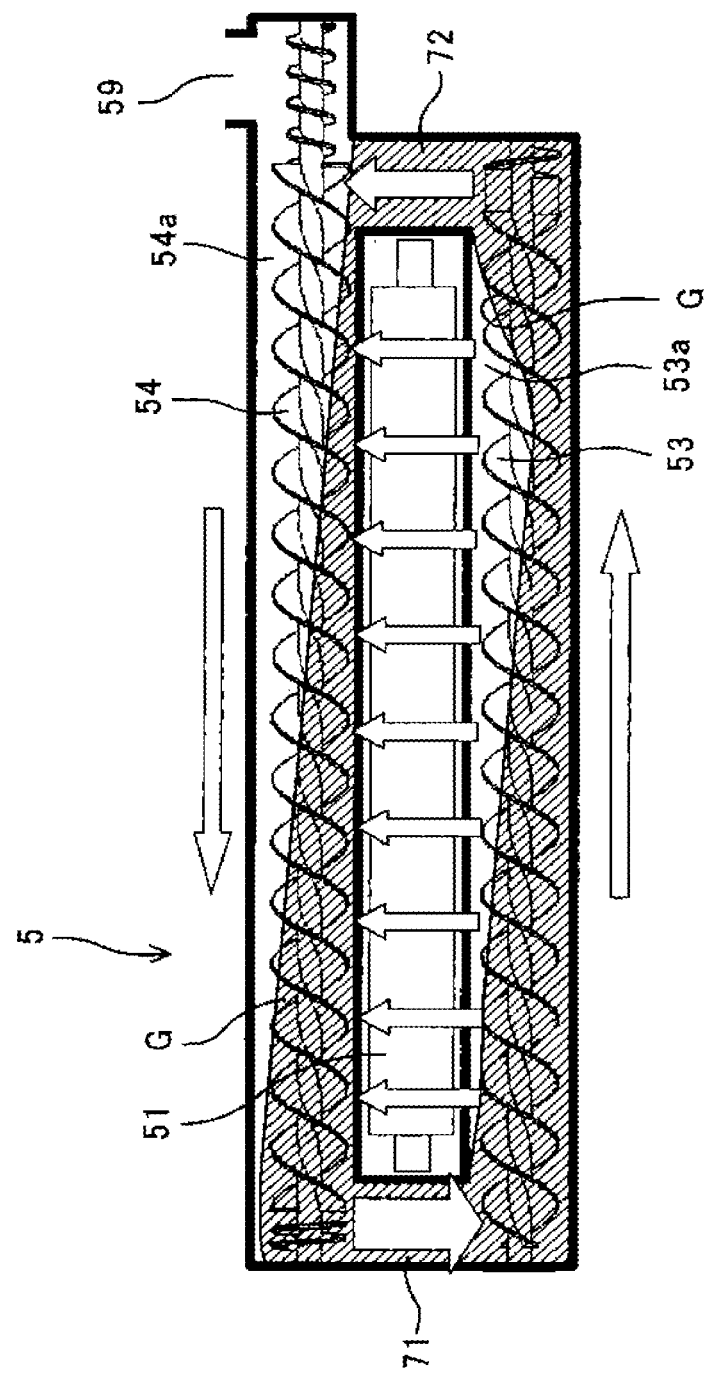
FIG. 5 is a schematic view illustrating movement of developer in a longitudinal direction inside the developing device.

FIG. 5 is a schematic view illustrating movement of the developer G in the longitudinal direction inside the developing device 5. In FIG. 5, blank arrows indicate flow of the developer G in the developing device 5.

Openings (i.e., a developer-falling opening 71 and a developer-lifting opening 72) are disposed in both end portions of the partition 57 (see FIG. 4) in the longitudinal direction of the developing device 5 and connect the supply channel 53*a* with the collecting channel 54*a*. As illustrated in FIG. 5, at the downstream end of the supply channel 53*a* in the direction in which the developer is transported (hereinafter, referred to as "developer conveyance direction") by the supply screw 53, the developer G is transported upward through the developer-lifting opening 72 in the partition 57 to the upstream end of the collecting channel 54*a* in the developer conveyance direction by the collecting screw 54. By contrast, at the downstream end of the collecting channel 54*a* in the developer conveyance direction by the collecting screw 54, the developer G is transported through the developer-falling opening 71 in the partition 57 to the upstream end of the supply channel 53*a* in the developer conveyance direction by the supply screw 53.

In FIG. 5, for the sake of convenience to schematically illustrate the flow of the developer G supplied to and collected from the developing sleeve 51, it is depicted that there is a certain distance between the supply channel 53*a* and the collecting channel 54*a*. However, the supply channel 53*a* and the collecting channel 54*a* are separated by the planar partition 57 as illustrated in FIG. 3, and the developer-falling opening 71 and the developer-lifting opening 72 are through holes in the planar partition 57.

As illustrated in FIG. 5, in the supply channel 53*a* disposed below the collecting channel 54*a*, the developer G is transported by the supply screw 53 to the right in FIG. 5 along the axial direction (longitudinal direction) of the supply screw 53. While the developer G in the supply channel 53*a* is transported by the supply screw 53, a certain amount of the developer G is scooped onto the surface of the developing sleeve 51 by the rotation of the supply screw 53 as well as the magnetic force exerted by the fifth pole P5 serving as a developer scooping pole. Then, the developer G carried on the developing sleeve 51 passes through the development range and reaches a position (hereinafter "developer release position") of a developer release pole formed by the third and fourth magnetic poles P3 and P4 having the same polarity (N), adjacent to each other. The developer G is separated from the developing sleeve 51 by the magnetic force exerted from the developer release pole and the partition 57 serving as the separator and is transported into the collecting channel 54*a*.

The collecting screw 54 in the collecting channel Ma disposed above the supply channel 53a transports the developer G separated from the developing sleeve 51 at the developer release position in the direction opposite the direction in which the supply screw 53 transports developer G along the axial direction (longitudinal direction) of the collecting screw 54.

Through the developer-lifting opening 72, the downstream end in the developer conveyance direction of the supply channel 53a in which the supply screw 53 is provided communicates with the upstream end in the developer conveyance direction of the collecting channel 54a in which the collecting screw 54 is provided. The developer G, which is not scooped onto the developing roller 50 from the supply channel 53a, is transported to the downstream end of the supply channel 53a, remains in the downstream end, and is pushed up by the following developer G. Thus, the developer G reaches the upstream end of the collecting channel 54a.

The toner supply inlet 59 is disposed at the upstream end of the collecting channel 54a, and fresh toner is supplied from the toner container 11 via the toner supply device and the toner hopper to the developing device 5 through the toner supply inlet 59 as required. Through the developer-falling opening 71, the upstream end of the supply channel 53a communicates with the downstream end of the collecting channel 54a in the developer conveyance direction. The developer G transported to the downstream end of the collecting channel 54a falls through the developer-falling opening 71 under the gravity to the upstream end of the supply channel 53a in the developer conveyance direction.

The developer G is transported from the downstream end of the supply channel 53a to the collecting channel 54a and further from the downstream end of the collecting channel 54a to the supply channel 53a, thereby circulating the developer G inside the developing device 5.

The amount of developer G in the supply channel 53a decreases toward the downstream side in the developer conveyance direction since a part of the developer G is scooped up to the developing roller 50 while being transported by the supply screw 53.

The fresh toner supplied through the toner supply inlet 59 is stirred and mixed with the developer G in the collecting channel 54a, while being transported by the collecting screw 54. The amount of developer G in the collecting channel 54a increases toward the downstream side in the developer conveyance direction since the collecting screw 54 transports the developer G in the collecting channel 54a while collecting the developer G that has passed through the development range and has been separated from the developing sleeve 51.

Additionally, the toner density sensor (or toner concentration detector) is disposed below the supply screw 53 in the supply channel 53a or below the collecting screw 54 in the collecting channel 54a. The density of toner inside the developing device 5 can be measured with the toner density sensor as required. Based on the measurement results, the controller can control the toner hopper so that the density of toner falls to a proper value.

As described above, in the developing device 5, the supply screw 53 and the collecting screw 54 rotate in the directions indicated by arrows in FIG. 3, and simultaneously the developer G is attracted to the developing sleeve 51 by the magnetic attraction exerted by the magnet roller 55 in the developing sleeve 51. Additionally, the developing sleeve 51 is rotated at a predetermined velocity ratio to the velocity of the photoconductor 1 to pump up the developer G to the development range consecutively. The third and fourth poles P3 and P4 (i.e., the developer release pole) generate a repulsive magnetic force, causing the developer G to separate from the developing sleeve 51. The developer G transported to the area in which the repulsive magnetic force is exerted is moved in the direction of the composite of direction normal to and tangential to the rotation of the developing sleeve 51. Then, the developer G falls under the gravity onto the partition 57 and is collected by the collecting screw 54.

Figure 6:
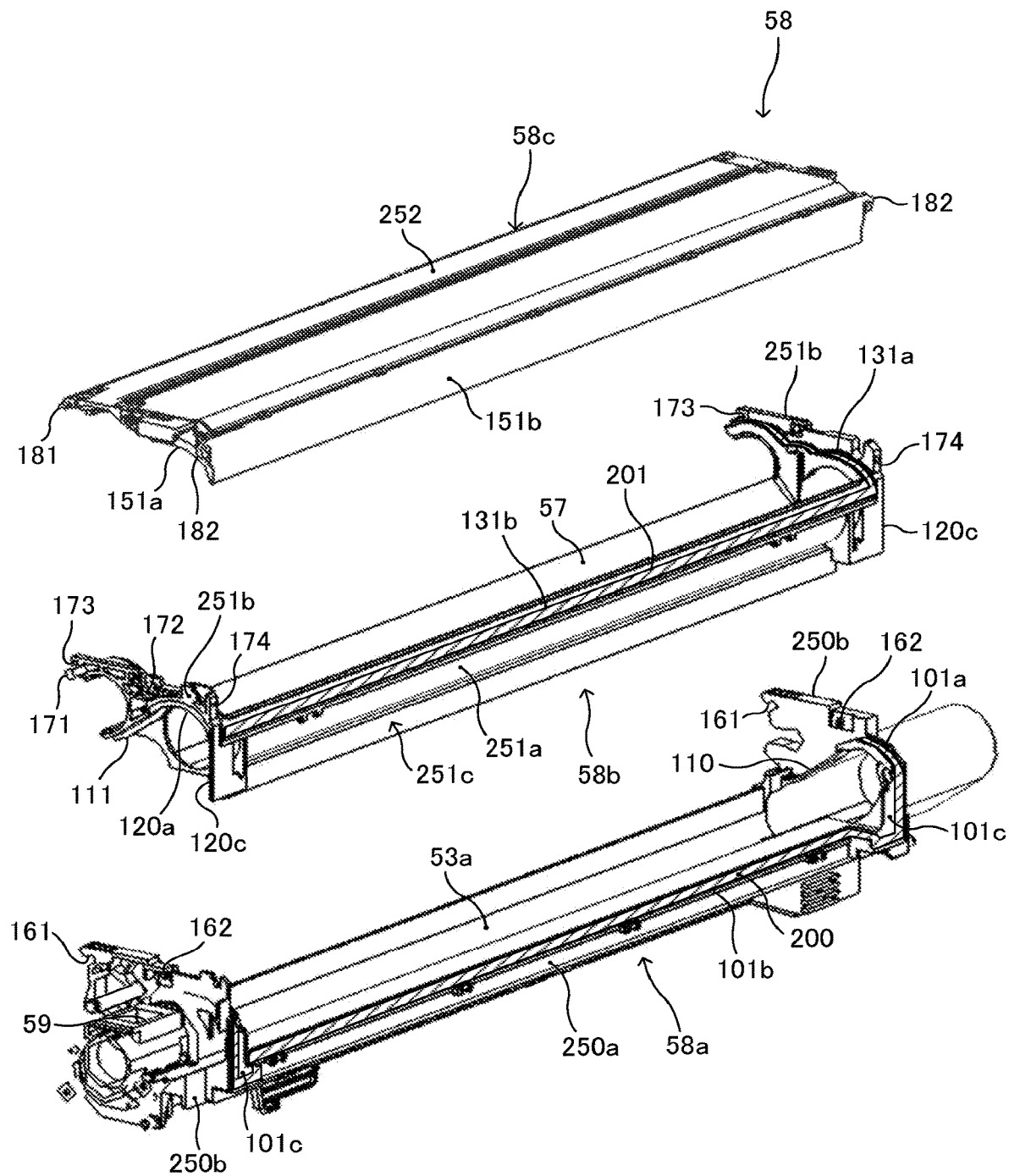
FIG. 6 is an exploded perspective view of a casing of the developing device.

FIG. 6 is an exploded perspective view of the casing 58 of the developing device 5.

The casing 58 includes the lower case 58a, the upper case 58b, and the cover 58c. The upper case 58b is positioned on the lower case 58a and secured to the lower case 58a with an adhesive 200 as a sealant. The cover 58c is positioned on the upper case 58b and secured to the upper case 58b with an adhesive 201 as the sealant.

The lower case 58a has the supply channel 53a and includes a bottom portion 250a and side walls 250b. The bottom portion 250a serving as a bottom of the casing 58 extends in the longitudinal direction (axial direction). The side walls 250b are disposed at both ends of the bottom portion 250a in the longitudinal direction, serving as side walls of the casing 58. One of the side walls 250b on the left side in FIG. 6 includes the toner supply inlet 59. The upper case 58b includes first positioning projections 171 and second positioning projections 172 at both ends. The both side walls 250b of the lower case 58a have a case positioning groove 161 disposed at the front side end of the upper portion (far side in FIG. 6 or the side where the developing roller 50 is disposed) and a case positioning hole 162 disposed at the center of the upper portion of the side walls 250b. The first positioning projection 171 engages the case positioning groove 161, and the second positioning projection 172 is inserted into the case positioning hole 162.

Flat seal attachment surfaces 110 to which sponge seals 140 (see FIG. 9) are attached are disposed on the inner wall surfaces of both side walls 250b. The sponge seals 140 are described later. Further, lower case application grooves 101a, which are recessed, as the application portions to which the adhesive 200 as the sealant is applied are disposed adjacent to the seal attachment surfaces 110.

Lower case application surfaces 101c as the application portions to which the adhesive 200 is applied are disposed adjacent to the lower case application grooves 101a at both ends in the longitudinal direction on the back surface of the bottom portion 250a (front side in FIG. 6, which is opposite side where the developing roller 50 is disposed). Further, a lower case step application portion 101b having a step shape as the application portion to which the adhesive 200 is applied is disposed adjacent to the lower case application surfaces 101c on the back surface of the bottom portion 250a. Here, the step shape is a shape formed by two adjacent surfaces that are orthogonal to each other, and one surface is located at the end of the other surface.

Thus, in the present embodiment, the lower case application groove 101a, the lower case application surface 101c, and the lower case step application portion 101b are disposed in a row. Therefore, as illustrated in FIG. 6, the adhesive 200 can be continuously applied to the lower case application groove 101a, the lower case application surface 101c, and the lower case step application portion 101b. Thus, the adhesive 200 can satisfactorily seal between the upper case 58b and the lower case 58. As described above, the lower case application groove 101a, the lower case application surface 101c, and the lower case step application portion 101b are disposed in a row, so that the adhesive 200 can be applied to the lower case application groove 101a, the lower case application surface 101c, and the lower case step application portion 101b in a single application operation. Therefore, the adhesive 200 can be automatically and easily applied by a machine.

The upper case 58b includes a back wall 251a extending in the longitudinal direction and inner side walls 251b disposed at both ends of the back wall 251a. The inner side walls 251b are orthogonal to the longitudinal direction. The partition 57 that partitions the supply channel 53a and the collecting channel 54a is attached to the back wall 251a.

The inner side walls 251b of the upper case 58b are includes an upper case adhesion projection 120a and a sealing projection 111. The upper case adhesion projection 120a serves as an adhesion portion that enters the lower case application groove 101a of the lower case 58a, and is bonded by the adhesive 200. The sealing projection 111 contacts the sponge seal 140 for sealing.

The first positioning projections 171 extending outward are disposed at the front side ends of both inner side walls 251b, and the second positioning projections 172 extending outward are disposed near the center of the upper portions of the both inner side walls 251b. The cover positioning grooves 173, which are engaged with cover positioning projections 181 of the cover 58c, are disposed at the front side ends of both inner side walls 251b. Further, cover positioning protrusions 174, which hook cover positioning hooks 182 of the cover 58c, are disposed at the rear side ends of both inner side walls 251b. The cover positioning hook 182 is a reference to position the cover 58c.

Upper case application grooves 131a, which are recessed, as the application portions to which an adhesive 201 as the sealant is applied are disposed on the inner surfaces of both inner side walls 251b. An upper case application surface 131b as the application portion to which the adhesive 201 is applied is disposed adjacent to the upper case application groove 131a on the back wall 251a of the upper case 58b.

In the upper case 58b, the upper case application groove 131a is disposed adjacent to the upper case application surface 131b to bond the cover 58c, so that the adhesive 201 can be applied to the upper case application groove 131a and the upper case application surface 131b continuously. Thus, the adhesive 201 can satisfactorily seal between the upper case 58b and the cover 58c. Further, the adhesive 201 can be applied to the upper case application groove 131a and the upper case application surface 131b by a single application operation, and the adhesive 201 can be automatically and easily applied by a machine.

Further, upper case adhesion surfaces 120c are disposed at both ends in the longitudinal direction of the back wall 251a. The upper case adhesion surfaces 120c serves as the adhesion portions facing the lower case application surface 101c of the lower case 58a, are bonded by the adhesive 200.

The back wall 251a includes a case adhesion surface 251c including an upper case step adhesion portion 120b (see FIGS. 12 and 14) on the inner surface. The upper case step adhesion portion 120b having a step shape as the adhesion portion faces the lower case step application portion 101b of the lower case 58a and is bonded by the adhesive 200.

The cover 58c includes a cover base 252 serving as an upper wall of the casing 58. Cover adhesion projections 151a projecting downward are disposed at both ends in the longitudinal direction of the cover base 252. The cover adhesion projections 151a as the adhesion portions enter the upper case application grooves 131a of the upper case 58b, and is bonded by the adhesive 201. Further, cover positioning projections 181 are disposed at the front side ends of both ends in the longitudinal direction of the cover base 252, and cover positioning hooks 182 is disposed at the back side ends.

Further, a cover adhesion surface 151b extending downward is disposed at the back side end of the cover base 252. The cover adhesion surface 151b as the adhesion portion facing the upper case application surface 131b is bonded to the upper case application surface 131b of the upper case 58b by the adhesive 201.

The adhesives 200 and 201 as the sealant applied to the lower case 58a and the upper case 58b may be any adhesive that has fluidity during a bonding operation and has the property of being curable (solidifiable) later. Moreover, a sealant having a certain amount of viscosity is preferable during the bonding operation. The certain amount of viscosity can prevent the sealant from flowing out of the application portion during the bonding operation. Various types of adhesives can be used, such as a hot melt adhesive that is applied in a melted state at a high temperature during the bonding operation and then solidified by being cooled, an ultraviolet curable adhesive that is cured by irradiation with ultraviolet rays, a thermosetting adhesive that is cured by heating, a solvent volatilization adhesive that is cured by volatilization of solvent components, or a moisture curable adhesive that is cured by reacting with moisture in the air, and the like.

Figure 7:
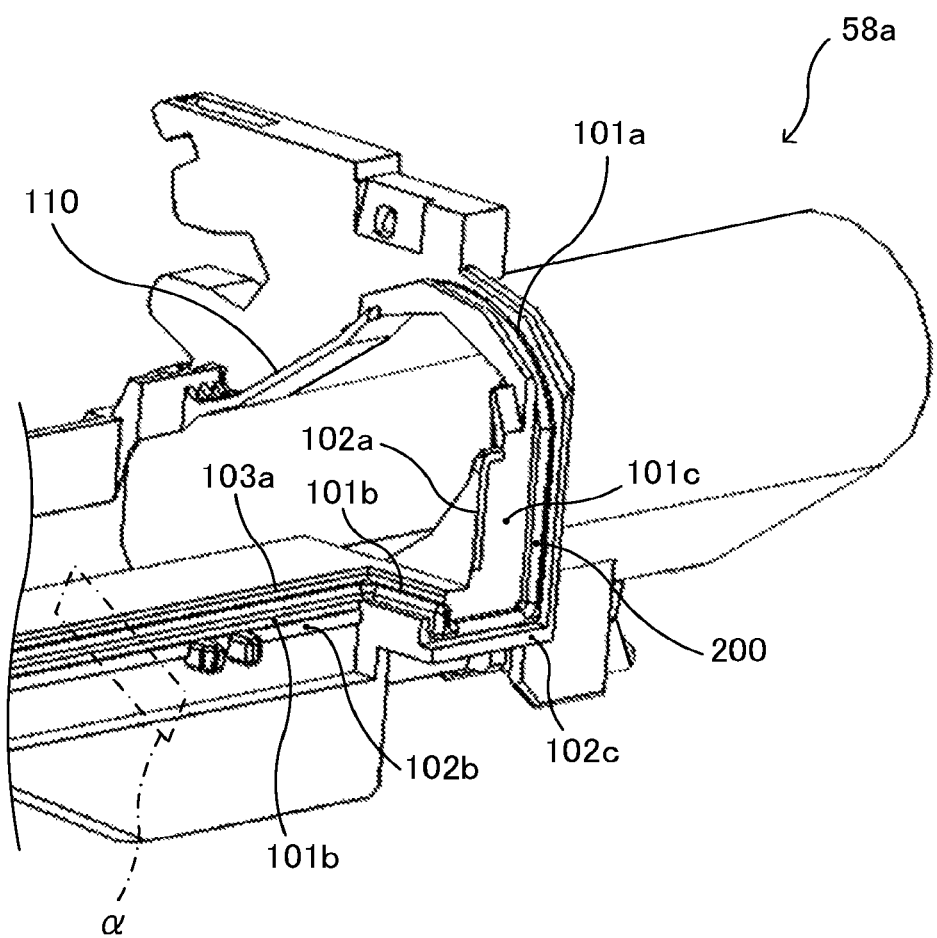
FIG. 7 is a perspective view of a part of a lower case of the developing device.

FIG. 7 is an enlarged perspective view of a part of the lower case 58a.

As illustrated in FIG. 7, a first case contact projection 102a as a position regulator is disposed in the vicinity of the lower case application surface 101c. The first case contact projection 102a contacts the upper case adhesion surface 120c of the upper case 58b to regulate the position of the upper case adhesion surface 120c. Further, a dam wall 102c is disposed at the outer edge portion of the lower case application surface 101c to block the adhesive 200 applied to the lower case application surface 101c and prevent the adhesive 200 from leaking outside.

Further, a second case contact projection 102b as another position regulator is disposed in the vicinity of the lower side of the lower case step application portion 101b. The second case contact projection 102b contacts the back wall 251a of the upper case 58b to regulate the position of the upper case step adhesion portion 120b (see FIGS. 12 and 14). In addition, on the upper side of the lower case step application portion 101b, an inclined surface 103a is inclined inward.

Figure 8:
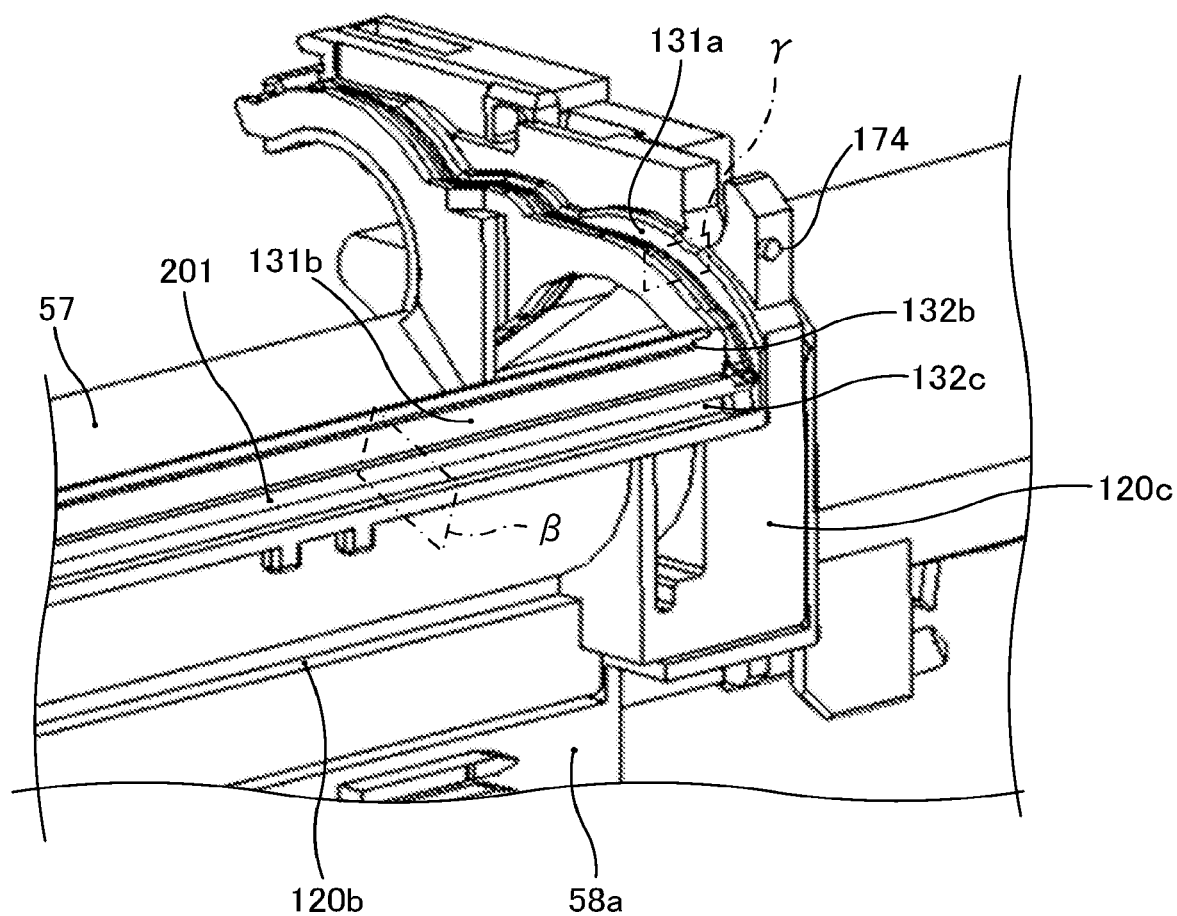
FIG. 8 is a perspective view of a part of an upper case of the developing device.

FIG. 8 is an enlarged perspective view of a part of the upper case 58b. As illustrated in FIG. 8, a cover contact projection 132b as yet another position regulator is disposed at the upper end of the upper case application surface 131b. The cover contact projection 132b contacts the upper cover adhesion surface 151b of the cover 58c to regulate the position of the cover adhesion surface 151b. In addition, a cover contact surface 132c as still yet another position regulator is disposed one step higher than the upper case application surface 131b at the lower end of the upper case application surface 131b. The cover contact surface 132c contacts the cover adhesion surface 151b of the cover 58c to regulate the position of the cover adhesion surface 151b.

Figure 9:
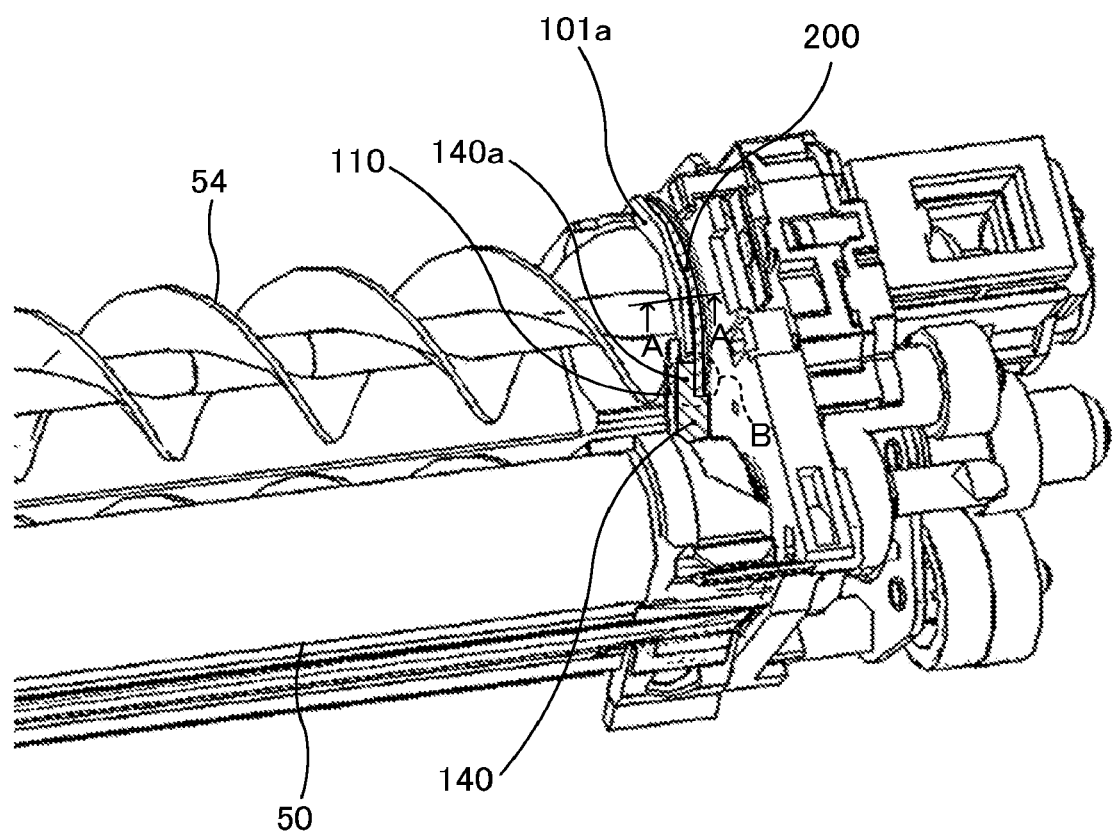
FIG. 9 is an enlarged perspective view of a portion of the lower case on one end in the longitudinal direction of the developing device as viewed from above.
Figure 10:
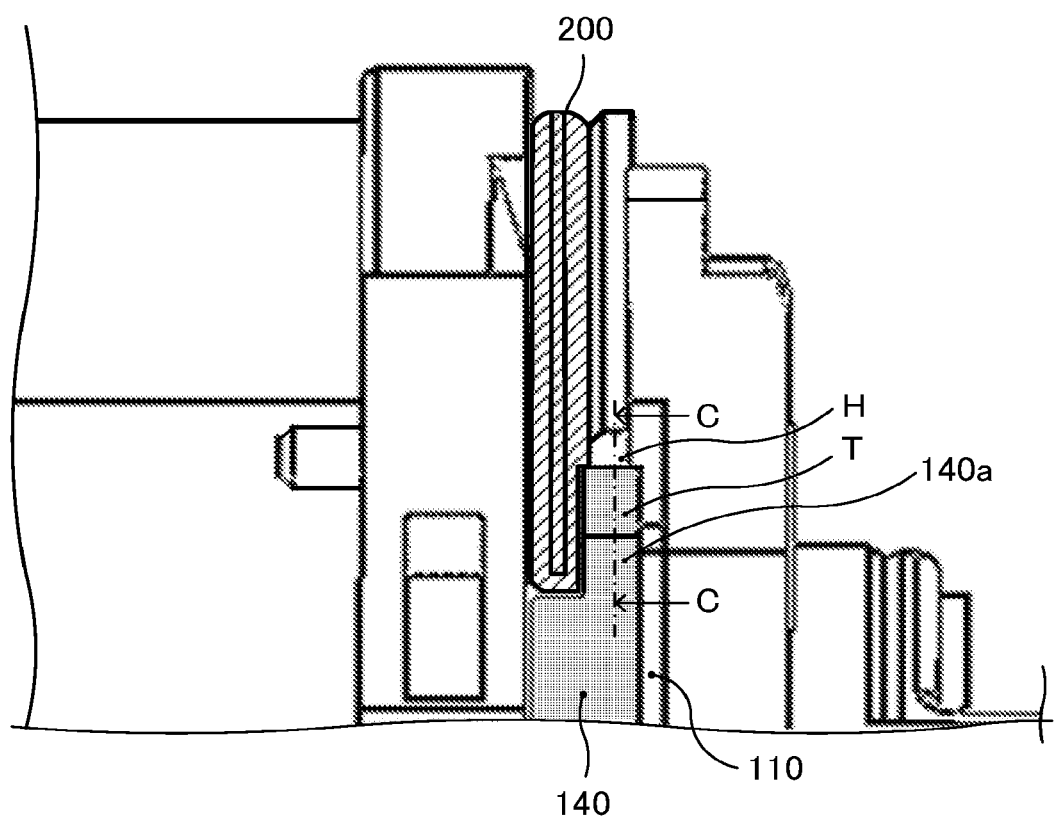
FIG. 10 is an enlarged view of a portion surrounded by a broken-line circle B in FIG. 9.
Figure 11:
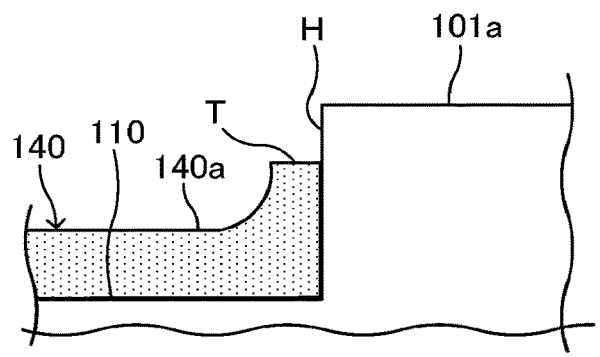
FIG. 11 is a cross-sectional view along line C-C in FIG. 10.

FIG. 9 is an enlarged perspective view of a part of the lower case 58a on one end in the longitudinal direction as viewed from above. FIG. 10 is an enlarged view of a portion surrounded by broken-line circle B in FIG. 9, and FIG. 11 is a cross-sectional view along line C-C in FIG. 10.

The sponge seal 140 as a seal is attached to the seal attachment surface 110 with, for example, double-sided tape. A portion of the sponge seal 140 on the side opposite the developing roller 50 has a cutout portion 140a that is the remaining portion of a rectangle sponge seal in which the outside portion in the longitudinal direction of the rectangle sponge seal is cut out. The sponge seal 140 on the side of the developing roller 50 contacts the surface of the developing roller 50 and seals a hole through which the shaft of the developing roller 50 is inserted.

The adhesive 200 is applied to an area next to the cutout portion 140a of the sponge seal 140 so that the adhesive 200 contacts the sponge seal 140. In the present embodiment, the cutout portion 140a of the sponge seal 140 functions as a part of the inner side wall of the lower case application groove 101a, and the cutout portion 140a prevents the adhesive 200 applied to the area next to the cutout portion 140a from flowing inward. Thus, by applying the adhesive 200 to the area next to the cutout portion 140a, the upper case 58b is sealed without any gap between the sponge seal 140 and the adhesive 200, thereby satisfactorily preventing the developer from leaking.

Further, the sponge seal 140 is disposed so that the front end T of the cutout portion 140a presses against the end surface H of the inner side wall of the lower case application groove 101a. As illustrated in FIG. 11, the front end T of the cutout portion 140a is attached to the end surface H of the inner side wall of the lower case application groove 101a in a state in which the front end T of the cutout portion 140a is curved along the end surface H of the inner side wall of the lower case application groove 101a. Accordingly, the sponge seal 140 can be reliably contacts the end surface H of the inner side wall of the lower case application groove 101a, thereby preventing the adhesive 200 applied to the area next to the cutout portion 140a from flowing into the inside through the gap between the front end T of the sponge seal 140 and the end face H of the inner side wall of the lower case application groove 101a.

Figure 12:
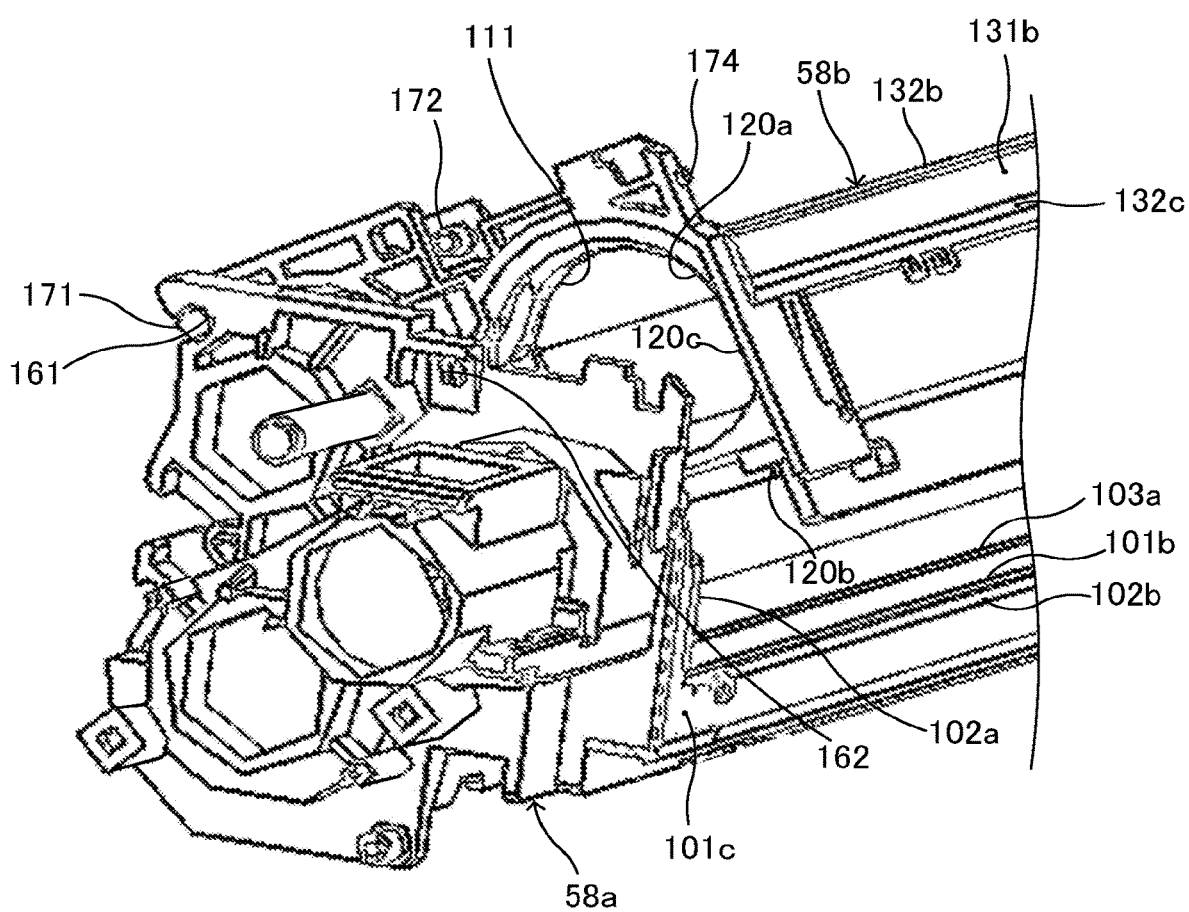
FIG. 12 is a perspective view illustrating a state in which the upper case is about to be positioned and secured to the lower case.

FIG. 12 is a perspective view illustrating a state in which the upper case 58b is about to being positioned and secured to the lower case 58a.

First, the first positioning projection 171 of the upper case 58b fits into the case positioning groove 161 of the lower case 58a. Next, the upper case 58b is rotated clockwise in FIG. 12 with the first positioning projection 171 as a fulcrum, and the second positioning projection 172 fits into the case positioning hole 162 of the lower case 58a to position the upper case 58b on the lower case 58a.

Figure 13:
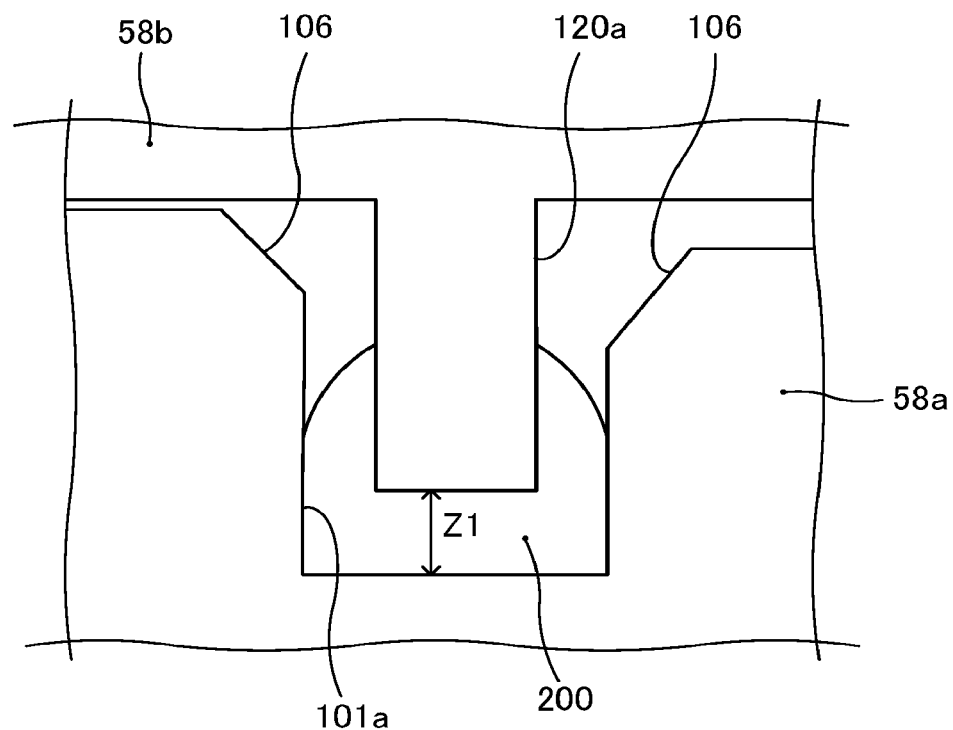
FIG. 13 is a schematic cross-sectional view along line A-A in FIG. 9 when the upper case is positioned on the lower case.

FIG. 13 is a schematic cross-sectional view along line A-A in FIG. 9 when the upper case 58b is positioned on the lower case 58a.

When the upper case 58b is positioned on the lower case 58a, the upper case adhesion projection 120a of the upper case 58b enters the lower case application groove 101a of the lower case 58a, and the head of the upper case adhesion projection 120a contacts the adhesive 200 applied to the lower case application groove 101a. As a result, the upper case adhesion projection 120a is bonded and sealed to the lower case application groove 101a.

Further, as the upper case adhesion projection 120a enters the lower case application groove 101a, the adhesive 200 applied to the lower case application groove 101a is crushed by the upper case adhesion projection 120a. However, in the present embodiment, the upper case 58b is positioned on the lower case 58a, and the position of the upper case 58b with respect to the lower case 58a is regulated. As a result, the head of the upper case adhesion projection 120a is regulated to stop at a distance Z1 from the bottom surface of the lower case application groove 101a, and does not move further toward the bottom surface. As described above, the relative positions of the upper case 58b and the lower case 58a is regulated so that a predetermined distance is formed between the upper case adhesion projection 120a and the lower case application groove 101a. Thus, the adhesive 200 can be prevented from being crushed more than necessary by the upper case adhesive projection 120a, and prevented from leaking out of the lower case application groove 101a.

As described above, in the present embodiment, the positioning configuration to position the upper case 58b on the lower case 58a (i.e., the first positioning projection 171 and the second positioning projection 172 of the upper case 58b, the case positioning groove 161 and the case positioning hole 162 of the lower case 58a) functions as the position regulator.

In the present embodiment, the positioning configuration that regulates the relative positions of the upper case 58b and the lower case 58a is disposed in the vicinity of the position where the upper case adhesion projection 120a and the lower case application groove 101a are bonded. As a result, the relative positions of the upper case adhesion projection 120a and the lower case application groove 101a can be determined with high accuracy, and the adhesive 200 can be prevented from leaking out of the lower case application groove 101a.

Further, in the present embodiment, since the positioning is performed outside the adhesion portion between the upper case adhesion projection 120a and the lower case application groove 101a in the longitudinal direction, the positional relationship between the upper case adhesion projection 120a and the lower case application groove 101a is determined with high accuracy, and the adhesive 200 can be prevented from leaking out of the lower case application groove 101a.

In the present embodiment, the positioning reference is disposed near the center in the transverse direction which is the direction perpendicular to both the longitudinal direction and the vertical direction. However, the positioning reference is preferably as close to the end of the back side as possible. With this configuration, the upper case 58b and the lower case 58a can be positioned outside the adhesion portion between the upper case adhesion projection 120a and the lower case application groove 101a in the transverse direction. Accordingly, the relative positions of the upper case adhesion projection 120a and the lower case application groove 101a and the relative positions of the lower case step application portion 101b and the upper case step adhesion portion 120b can be accurately determined. As a result, the predetermined distance Z1 in FIG. 13 between the upper case adhesion projection 120a and the lower case application groove 101a and a predetermined gap α in FIG. 14 between the lower case step application portion 101b and the upper case step adhesion portion 120b can be ensured reliably.

In the present embodiment, as illustrated in FIG. 13, the upper side of the inner surface of the lower case application groove 101a is a tapered surface 106. As a result, the tapered surface 106 can increase the volume of the lower case application groove 101a as compared with the case in which the tapered surface 106 is not provided. This configuration prevents the adhesive 200 from leaking out of the lower case application groove 101a even if the amount of the adhesive 200 applied to the lower case application groove 101a is slightly larger than the specified amount.

Figure 14:
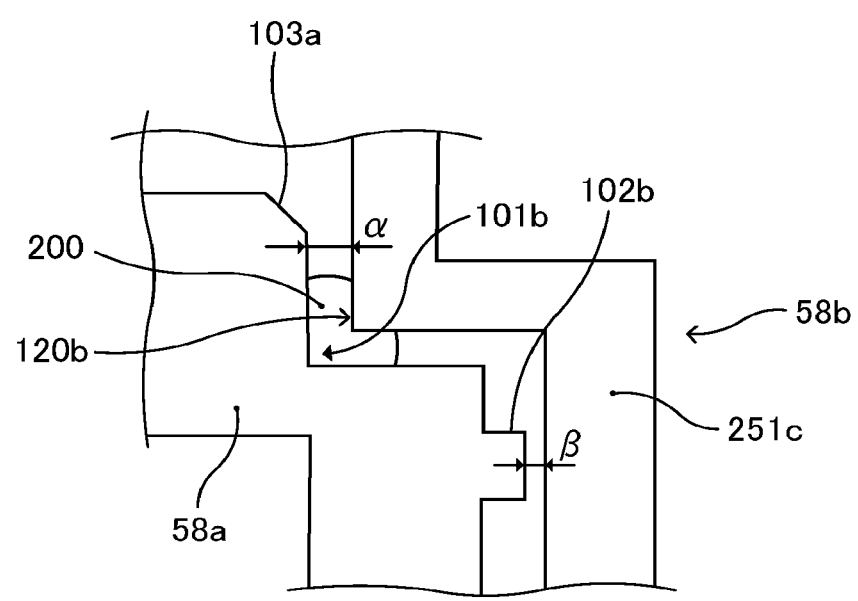
FIG. 14 is a schematic cross-sectional view of a portion surrounded by rectangle α in FIG. 7 when the upper case is positioned on the lower case.

FIG. 14 is a schematic cross-sectional view of a portion surrounded by rectangle α in FIG. 7 when the upper case 58b is positioned on the lower case 58a.

When the upper case 58*b* is positioned on the lower case 58*a*, the upper case step adhesion portion 120*b* crushes the adhesive 200 applied to the lower case step application portion 101*b*, and the upper case step adhesion portion 120*b* and the lower case step application portion 101*b* are bonded and sealed with the adhesive 200. In addition, a gap α is formed between the upper case step adhesion portion 120*b* and the lower case step application portion 101*b*. Further, at that time, a gap is formed between the second case contact projection 102*b* and the inner wall of the case adhesion surface 251*c* having the upper case step adhesion portion 120*b* inside the upper case 58*b*. The gap β is narrower than the gap α.

The case adhesion surface 251*c* of the upper case 58*b* is away from a position to position the upper case 58*b* on the lower case 58*a*. The case adhesion surface 251*c* has a plate shape extending in the longitudinal direction, and has a low rigidity in a direction perpendicular to the surface of the case adhesion surface 251*c*. Accordingly, when an operator presses the case adhesion surface 251*c*, the case adhesion surface 251*c* may be deformed toward the lower case step application portion 101*b*, and the upper case step adhesion portion 120*b* disposed on the case adhesion surface 251*c* may excessively crush the adhesive 200, causing the adhesive 200 to leak from the lower case step application portion 101*b*.

However, in the present embodiment, the second case contact projection 102*b* is provided as the position regulator that contacts the case adhesion surface 251*c* and regulates the position of the upper case step adhesion portion 120*b* As described above, the gap β between the second case contact projection 102*b* and the inner wall of the case adhesion surface 251*c* is narrower than the gap α between the lower case step application portion 101*b* and the upper case step adhesion portion 120*b*. Therefore, when the operator presses the case adhesion surface 251*c* and the case adhesion surface 251*c* is deformed toward the lower case step application portion 101*b*, the case adhesion surface 251*c* contacts the second case contact projection 102*b* and the relative positions of the upper case 58*b* and the lower case 58*a* is regulated before the upper case step adhesion portion 120*b* contacts the lower case step application portion 101*b*. As a result, a predetermined gap (α−β) is maintained between the lower case step application portion 101*b* and the upper case step adhesion portion 120*b*, thereby preventing the adhesive 200 applied to the lower case step application portion 101*b* from being excessively crushed.

As described above, the relative positions of the upper case 58*b* and the lower case 58*a* is regulated by the second case contact projection 102*b* so that the predetermined gap (α−β) is formed (maintained) between the lower case step application portion 101*b* and the upper case step adhesion portion 120*b*, thereby preventing the adhesive 200 applied to the lower case step application portion 101*b* from leaking out of the lower case step application portion 101*b*.

In the present embodiment, when the upper case 58*b* is positioned on the lower case 58*a*, the second case contact projection 102*b* does not contact the inner wall of the case adhesion surface 251*c*. In another embodiment, the second case contact projection 102*b* may contact the inner wall of the case adhesion surface 251*c* when the upper case 58*b* is positioned on the lower case 58*a*.

However, when the upper case 58*b* is positioned on the lower case 58*a*, the second case contact projection 102*b* preferably does not contact the inner wall of the case adhesion surface 251*c*. This is because, when the upper case 58*b* is positioned on the lower case 58*a* with the configuration in which the second case contact projection 102*b* contacts the inner wall of the case adhesion surface 251*c*, if the second case contact projection 102*b* is higher than the target height due to manufacturing tolerances, the upper case step adhesion portion 120*b* may not crush the adhesive 200 applied to the lower case step application portion 101*b* by a desired amount or may not contact the adhesive 200 applied to the lower case step application portion 101*b*, causing sealing failure.

In the present embodiment, the lower case step application portion 101*b* is provided with an inclined surface 103*a* inclined inward. The inclined surface 103*a* can increase the volume of the space between the upper case 58*b* above the lower case step application portion 101*b* and the lower case 58*a*. Therefore, the adhesive 200 crushed by the upper case step adhesion portion 120*b* can be prevented from leaking inside the casing 58.

In the present embodiment, the second case contact projection 102*b* also has a function of blocking the adhesive 200 and preventing the adhesive 200 from leaking outside.

Further, as the upper case 58*b* is positioned on the lower case 58*a*, the adhesive 200 applied to the lower case application surface 101*c* is crushed by the upper case adhesion surface 120*c*, and the upper case adhesion surface 120*c* is bonded to the lower case application surface 101*c*. Similarly to the case adhesion surface 251*c*, the upper case adhesion surface 120*c* is away from the position to position the upper case 58*b* on the lower case 58*a*. Therefore, when pressed, the upper case adhesion surface 120*c* moves toward the lower case application surface 101*c*. As a result, the adhesive 200 applied to the lower case application surface 101*c* may be excessively crushed.

However, in the present embodiment, as illustrated in FIG. 7, the first case contact projection 102*a* is disposed in the vicinity of the lower case application surface 101*c*. When the upper case 58*b* is positioned on the lower case 58*a*, the first case contact projection 102*a* faces the upper case adhesion surface 120*c* with a gap. This gap is narrower than the distance between the lower case application surface 101*c* and the upper case adhesion surface 120*c*. Therefore, when the operator presses the upper case adhesion surface 120*c*, the first case contact projection 102*a* contacts the upper case adhesion surface 120*c* and regulates the relative positions of the upper case 58*b* and the lower case 58*a* before the upper case adhesion surface 120*c* contacts the lower case application surface 101*c*. As a result, a predetermined gap is maintained between the lower case application surface 101*c* and the upper case adhesion surface 120*c*, thereby preventing the adhesive 200 applied to the lower case step application portion 101*b* from being excessively crushed.

As described above, the relative positions of the upper case 58*b* and the lower case 58*a* is regulated by the first case contact projection 102*a* so that the predetermined gap is formed (maintained) between the lower case application surface 101*c* and the upper case adhesion surface 120*c*, thereby preventing the adhesive 200 applied to the lower case application surface 101*c* from being excessively crushed and leaking out of the lower case step application portion 101*b*.

Similarly to the second case contact projection 102*b*, the first case contact projection 102*a* does not contact the upper case adhesion surface 120*c* when the upper case 58*b* is positioned on the lower case 58*a*. As a result, even if the second case contact projection 102*b* is slightly higher than the target height due to manufacturing tolerances, the case adhesion surface 251*c* can be positioned at a predetermined position and the adhesive 200 applied to the lower case application surface 101c can be appropriately crushed.

Further, in the present embodiment, the first case contact projection 102a can dam the adhesive 200 and prevent the adhesive 200 from leaking inside.

In the present embodiment, the position regulator to regulate the relative positions of the lower case 58a and the upper case 58b is provided between the lower case 58a and the upper case 58b so that a predetermined gap is formed between the application portion of the lower case 58a and the adhesion portion of the upper case 58b. The application portion of the lower case 58a includes the lower case application groove 101a, the lower case step application portion 101b, and the lower case application surface 101c. The adhesion portion of the upper case 58b includes the upper case adhesion projection 120a, the upper case step adhesion portion 120b, and the upper case adhesion surface 120c. A position regulator includes the case positioning groove 161, the case positioning hole 162, the first case contact projection 102a, and the second case contact projection 102b. Therefore, the adhesive 200 applied to the application portion is prevented from being excessively crushed and leaking.

In the present embodiment, the position regulator that regulate the relative positions of the lower case 58a and the upper case 58b (i.e., the case positioning groove 161, the case positioning hole 162, the first case contact projection 102a, and the second case contact projection 102b) is disposed in the vicinity of the application portion (i.e., the lower case application groove 101a, lower case step application portion 101b, and the lower case application surface 101c). As a result, the predetermined gap between the application portion and the adhesion portion (i.e., the upper case adhesion projection 120a, the upper case step adhesion portion 120b, and the upper case adhesion surface 120c) can be formed with sufficient accuracy.

Further, in the present embodiment, since the upper case 58b is positioned on the lower case 58a, each adhesion portion of the upper case 58b (i.e., the upper case adhesion projection 120a, the upper case step adhesion portion 120b, the upper case adhesion surface 120c) can be reliably positioned at a predetermined position. As a result, the adhesion portion of the upper case 58b (i.e., the upper case adhesion projection 120a, the upper case step adhesion portion 120b, and the upper case adhesion surface 120c) can reliably contact the adhesive 200, and the adhesive 200 can satisfactorily seal between the upper case 58b and the lower case 58a.

Further, in the present embodiment, since the upper case 58b is positioned on the lower case 58a, the upper case 58b is prevented from easily moving in the direction in which the upper case 58b falls off the lower case 58a. Therefore, the upper case 58b does not move in the direction in which the upper case 58b falls off the lower case 58a until the adhesive 200 is solidified and the adhesion between the upper case 58b and the lower case 58a is completed. Thus, the upper case 58b and the lower case 58a are reliably bonded, thereby preventing the sealing failure.

In the above embodiment, the position regulator (i.e., the first case contact projection 102a and the second case contact projection 102b) is disposed in the lower case 58a.

Alternatively, the position regulator may be disposed in the upper case 58b. Further, an application portion to which the adhesive 200 is applied may be disposed in the upper case 58b, and an adhesion portion that is bonded with the adhesive 200 may be disposed in the lower case 58a.

Figure 15:
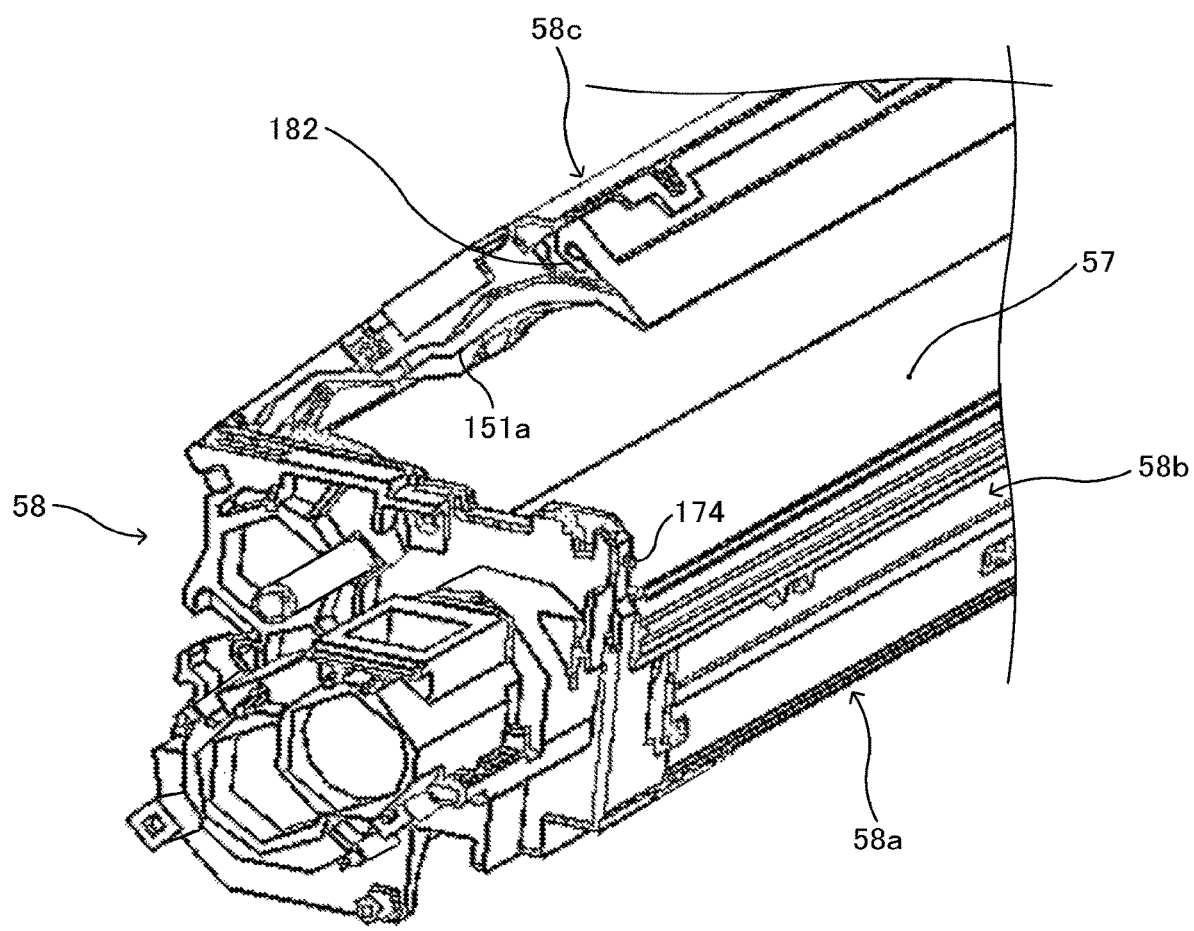
FIG. 15 is a perspective view illustrating a state in which a cover of the developing device is about to be positioned and secured to the upper case.

FIG. 15 is a perspective view illustrating a state in which the cover 58c is about to being positioned and secured to the upper case 58b.

The cover positioning projection 181 (see FIG. 6) of the cover 58c fits into the cover positioning groove 173 (see FIG. 6) of the upper case 58b, and the cover 58c is rotated clockwise in FIG. 15 with the cover positioning projection 181 as a fulcrum. Then, the cover positioning hook 182 is hooked on the cover positioning protrusion 174. As a result, the cover 58c is positioned on the upper case 58b.

Figure 16:
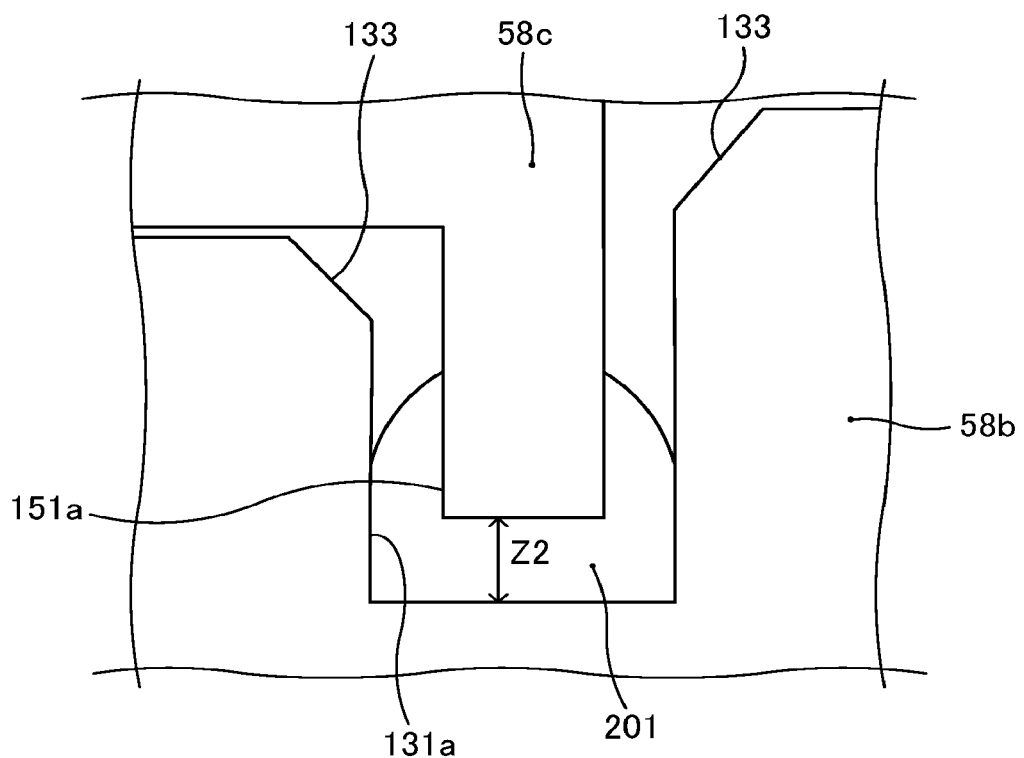
FIG. 16 is a schematic cross-sectional view of a portion surrounded by rectangle γ in FIG. 8 when the cover is positioned on the upper case.

FIG. 16 is a schematic cross-sectional view of a portion surrounded by rectangle γ in FIG. 8 when the cover 58c is positioned on the upper case 58b.

When the cover 58c is positioned on the upper case 58b, the cover adhesion projection 151a of the cover 58c enters the upper case application groove 131a of the upper case 58b, and the head of the cover adhesion projection 151a appropriately crushes the adhesive 201 applied to the upper case application groove 131a, and the cover adhesion projection 151a is bonded and sealed to the upper case application groove 131a.

In the present embodiment, the cover 58c is positioned on the upper case 58b and the position of the cover 58c with respect to the upper case 58b is regulated. As a result, the head of the cover adhesion projection 151a is regulated at a distance Z2 from the bottom surface of the upper case application groove 131a, and does not move further toward the bottom surface. As described above, the relative positions of the cover 58c and the upper case 58b is regulated so that a predetermined gap is formed between the cover adhesion projection 151a and the upper case application groove 131a. Thus, the adhesive 201 can be prevented from being crushed more than necessary by the cover adhesive projection 151a, and prevented from leaking out of the upper case application groove 131a.

Further, in the present embodiment, the cover 58c is positioned on the upper case 58b outside the adhesion portion, in which the cover adhesion projection 151a and the upper case application groove 131a are bonded, in the longitudinal direction and in the transverse direction which is the direction perpendicular to both the longitudinal direction and the vertical direction. Further, the cover 58c is positioned on the upper case 58b in the vicinity of the adhesion portion in which the cover adhesion projection 151a and the upper case application groove 131a are bonded. As a result, the relative positions of the cover adhesion projection 151a and the upper case application groove 131a can be satisfactorily determined with high accuracy, and the adhesive 201 can be prevented from leaking out of the upper case application groove 131a. Further, since the positioning by the cover positioning protrusion 174 and the cover positioning hook 182 is performed at the end portion in the longitudinal direction of the back surface, the positional relationship between the upper case application surface 131b and the cover adhesion surface 151b can be determined with high accuracy. Accordingly, a predetermined gap ($X_2$ in FIG. 17) can be reliably ensured between the upper case application surface 131b and the cover adhesion surface 151b, and the adhesive 201 is less likely to leak from the upper case application surface 131b.

Similarly to the lower case application groove 101a, the upper case application groove 131a has tapered surfaces 133 on the upper side of the upper case application groove 131a, so that the adhesive 201 is less likely to leak from the upper case application groove 131a.

Figure 17:
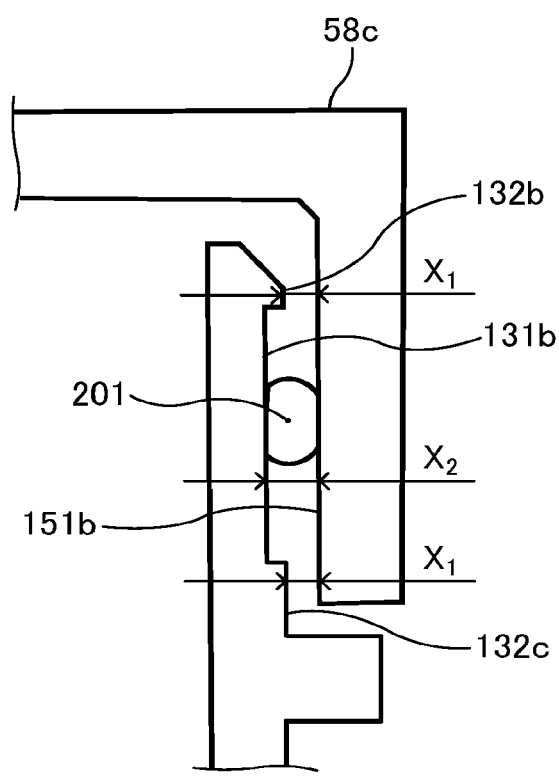
FIG. 17 is a schematic cross-sectional view of a portion surrounded by rectangle β in FIG. 8 when the cover is positioned on the upper case.

FIG. 17 is a schematic cross-sectional view of a portion surrounded by rectangle β in FIG. 8 when the cover 58c is positioned on the upper case 58b.

As the cover 58c is positioned on the upper case 58b, the adhesive 201 applied to the upper case application surface 131b is appropriately crushed by the cover adhesion surface 151b, and the cover adhesion surface 151c is bonded to the upper case application surface 131b.

The cover adhesion surface 151b is away from a position to position the cover 58c on the upper case 58b and is elongated in the longitudinal direction as illustrated in FIG. 6. Accordingly, the cover adhesion surface 151b is likely to being deformed. Therefore, when the cover adhesion surface 151b is pressed toward the upper case application surface 131b, the cover adhesion surface 151b moves toward the upper case application surface 131b.

However, in the present embodiment, a cover contact projection 132b is disposed above the upper case application surface 131b, and a cover contact surface 132c is disposed below the upper case application surface 131b. The cover contact projection 132b and the cover contact surface 132c project from the upper case application surface 131b toward the cover adhesion surface 151b. Further, at that time, a gap $X_1$ is formed between the cover adhesion surface 151b and the cover contact projection 132b, and between the cover adhesion surface 151b and the cover contact surface 132c. The gap $X_1$ is narrower than the gap $X_2$. Therefore, when the cover adhesion surface 151b is pressed and moved toward the upper case application surface 131b, the cover adhesion surface 151b contacts the cover contact projection 132b and the cover contact surface 132c, thereby regulating the relative positions of the cover 58c and the upper case 58b. As a result, a predetermined gap is reliably formed between the upper case application surface 131b and the cover adhesion surface 151b, thereby preventing the adhesive 201 applied to the upper case application surface 131b from being excessively crushed and leaking out of the upper case application surface 131b.

Further, steps of the cover contact projection 132b and the cover contact surface 132c with respect to the upper case application surface 131b can dam the adhesive 201 and prevent the adhesive 201 from leaking out. The cover contact projection 132b is disposed above the upper case application surface 131b, and the cover contact surface 132c is disposed below the upper case application surface 131b. This configuration can more reliably prevent the adhesive 201 applied to the upper case application surface 131b from leaking out of the upper case application surface 131b.

In the present embodiment, the position regulator that regulate the relative positions of the cover 58c and the upper case 58b is disposed in the upper case 58b so that a predetermined gap is formed between the upper case application surface 131b and the cover adhesion surface 151b. Alternatively, a position regulator may be disposed in the cover 58c.

In the present embodiment, as the cover 58c is positioned on the upper case 58b, each adhesion portion of the cover 58c (i.e., the cover adhesion projection 151a and the cover adhesion surface 151b) reliably contacts and appropriately crushes the adhesive 201 applied to the corresponding application portion of the upper case 58b (i.e., the upper case application groove 131a and the upper case application surface 131b). As a result, the adhesive 201 can seal between the upper case 58b and the cover 58c.

Further, since the cover 58c is positioned on the upper case 58b, the cover 58c is prevented from easily moving in the direction in which the cover 58c falls off the upper case 58b. Therefore, the cover 58c does not move in the direction in which the cover 58c falls off the upper case 58b until the adhesive 201 is solidified and the adhesion between the upper case 58b and the cover 58c is completed. Thus, the upper case 58b and the cover 58c are reliably bonded, thereby preventing the sealing failure.

Further, since the cover 58c is positioned on the upper case 58b, the cover 58c and the developing roller 50 can be provided with an appropriate gap. As a result, rotation of the developing roller 50 can generate an appropriate suction airflow between the developing roller 50 and the cover 58c, thereby preventing toner scattering.

Further, the position regulator that regulates the position of the cover 58c (i.e., the cover positioning groove 173, the cover positioning protrusion 174, the cover contact projection 132b, and the cover contact surface 132c) is disposed in the vicinity of the application portion of the upper case 58b (i.e., the upper case application groove 131a and the upper case application surface 131b), thereby preventing the adhesive 201 applied to the upper case 58b from being excessively crushed and leaking out.

Note that, in another embodiment, an application portion to which the adhesive 201 is applied may be disposed in the cover 58c, and an adhesion portion bonded to the cover 58c may be disposed in the upper case 58b.

In the above-described embodiments, the present disclosure is applied to the casing 58 of the developing device 5. However, the present disclosure can be also applied to the toner container 11 to store toner as the developer, an excess toner receptacle to store excess toner as the developer, and the like.

The embodiments described above are examples and can provide, for example, the following effects, respectively.

Aspect 1

A developer container such as the casing 58 includes a plurality of components combined together to form a space to store a developer. The plurality of components includes a first component and a second component. In the above-described embodiments, the first component and the second component are the lower case 58a and the upper case 58b, or the upper case 58b and the cover 58c. The developer container further includes a sealant to bond the first component and the second component to seal between the first component and the second component, and a position regulator to regulate relative positions of the first component and the second component so as to maintain a distance between an adhesion portion of the first component and an adhesion portion of the second component.

According to Aspect 1, the position regulator regulates the relative positions of the first component and the second component, thereby preventing the distance between the adhesion portion of the first component and the adhesion portion of the second component from being narrower than the predetermined distance. Therefore, the adhesive can be prevented from being excessively crushed and leaking out.

Aspect 2

In Aspect 1, the position regulator positions the second component relative to the first component. In the above-described embodiment, the position regulator includes the case positioning groove 161 and the first positioning projection 171, the case positioning hole 162 and the second positioning projection 172, the cover positioning groove 173 and the cover positioning projection 181, and the cover positioning protrusion 174 and the cover positioning hook 182.

According to Aspect 2, as described in the above embodiments, the adhesion portion of the second component with respect to the adhesion portion of the first component can be positioned substantially at the target position, thereby reliably contacting one of the adhesion portion of the first component and the adhesion portion of the second component with the sealant applied to the other of the adhesion portion of the first component and the adhesion portion of the second component. In addition, the first component can be prevented from moving in the direction in which the first component falls off the second component until the sealant is solidified. Therefore, the adhesion portion of the first component and the adhesion portion of the second component can be satisfactorily bonded with the sealant, thereby sealing between the first component and the second component firmly.

Aspect 3

In Aspect 2, the position regulator is disposed outside the adhesion portion.

According to Aspect 3, as described in the above embodiments, the adhesion portion of the second component with respect to the adhesion portion of the first component can be positioned at the target position with high accuracy. Therefore, the adhesion portion of the first component and the adhesion portion of the second component can be satisfactorily bonded with the sealant, thereby sealing between the first component and the second component firmly.

Aspect 4

In any one of Aspects 1 to 3, one of the adhesion portion of the first component and the adhesion portion of the second component is an application portion to which the sealant is applied, and the application portion is recessed or step-shaped. In the above-described embodiments, the application portion includes the lower case application groove 101a and the upper case application groove 131a that are recessed, and the lower case step application portion 101b that is step-shaped.

According to Aspect 4, the sealant having fluidity during the adhesion operation can be satisfactorily held. That is, the sealant can be prevented from flowing out of the application portion.

Aspect 5

In aspect 4, the adhesion portion bonded to the application portion that is recessed is projection-shaped. In the above-described embodiments, the adhesion portion that is projection-shaped includes the upper case adhesion projection 120a and the cover adhesion projection 151a.

According to Aspect 5, the adhesion portion can be reliably contact the sealant applied to the recess of the application portion that is recessed, thereby bonding the adhesion portion to the application portion firmly.

Aspect 6

In the aspect 4 or 5, the application portion that is recessed is disposed adjacent to the application portion that is step-shaped.

According to Aspect 6, as described in the above embodiments, the sealant can seamlessly seal between the first component and the second embodiment.

Aspect 7

In any one of Aspects 1 to 6, the developer container further includes a seal. The seal such as the sponge seal 140 is elastically deformed to seal between the first component such as the lower case 58a and the second component such as the upper case 58b, and the sealant such as the adhesive 200 contacts the seal.

According to Aspect 7, the seal such as the sponge seal 140 and the sealant such as the adhesive 200 can seamlessly seal between the first component such as the lower case 58a and the second component such as the upper case 58b.

Aspect 8

In the aspect 7, the seal such as the sponge seal 140 includes a cutout portion 140a that is a remaining portion of the seal in which a portion of the seal is cut out. The sealant such as the adhesive 200 is applied to an area, where the seal is cut out, next to the cutout portion 140a.

According to Aspect 8, the seal such as the sponge seal 140 is seamlessly disposed adjacent to the sealant such as the adhesive 200.

Aspect 9

In aspect 8, the recessed application portion, such as the lower case application groove 101a to which the sealant such as the adhesive 200 is applied, is disposed adjacent to an attachment portion such as the seal attachment surface 110 to which the seal such as the sponge seal 140 is attached.

According to Aspect 9, the sealant such as the adhesive 200 can be seamlessly applied to the area, where the seal is cut out, next to the cutout portion 140a.

Aspect 10

In the aspect 9, a head of the cutout portion 140a is attached to an end surface H of a side wall of the recessed application portion such as the lower case application groove 101a.

According to Aspect 10, as described in the above embodiments, the sealant such as the adhesive 200 applied to the area, where the seal is cut out, next to the cutout portion 140a can be prevented from flowing out through the gap between the end surface H of the side wall of the recessed application portion such as the lower case application groove 101a and the head of the cutout portion 140a.

Aspect 11

In any one of Aspects 7 to 10, the developer container further includes a rotator such as the developing roller 50. The seal such as the sponge seal 140 contacts the rotator.

According to Aspect 11, the seal can seal around the rotator without hindering the rotation of the rotator such as the developing roller 50.

Aspect 12

In any one of Aspects 1 to 11, the position regulator is disposed in the vicinity of the adhesion portion.

According to Aspect 11, as described in the above embodiments, when the position relation between the first component and the second component is regulated by the position regulator, the gap between the adhesion portion of the first component and the adhesion portion of the second component can be a target gap, thereby reliably preventing the sealant from being excessively crushed.

Aspect 13

In any one of the Aspects 1 to 12, the position regulator is projection-shaped and projects from an application surface to which the sealant is applied. In the above-described embodiments, the position regulator includes first case contact projection 102a and the second case contact projection 102b.

According to Aspect 13, one of the first component and the second component contacts the position regulator of the other of the first component and the second component contacts having the application surface, thereby regulating the relative positions of the first component and the second component. As a result, the sealant can be reliably prevented from being excessively crushed.

Aspect 14

A developing device includes a developer bearer such as the developing roller 50 to bear a developer, rotate, and develop a latent image on an image bearer such as the photoconductor 1 and the developer container according to any one of Aspects 1 to 13, to store the developer.

According to Aspect 14, the sealant can be prevented from leaking out.

Aspect 15

An image forming apparatus includes an image bearer such as the photoconductor 1 to bear a latent image, a developing device such as the developing device 5 to develop the latent image on the image bearer with a developer, and the developer container according to any one of aspects 1 to 13, to store the developer.

As a result, the sealant can be prevented from leaking out.

Therefore, according to the present disclosure, overflow of sealant can be minimized.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. A developer container, comprising:
    a plurality of components combined together to form a space to store a developer, the plurality of components including a first component and a second component;
    a sealant to bond the first component and the second component;
    a first position regulator to regulate relative positions of the first component and the second component so as to maintain a distance between an adhesion portion of the first component and an adhesion portion of the second component, and a second position regulator to prevent the first component from separating from the second component; and
    a seal, wherein the seal is elastically deformed to seal between the first component and the second component.

2. The developer container according to claim 1, wherein the second, position regulator positions the second component relative to the first component.

3. The developer container according to claim 2, wherein the second position regulator is disposed outside the adhesion portion of the first component and the adhesion portion of the second component.

4. The developer container according to claim 1, wherein one of the adhesion portion of the first component and the adhesion portion of the second component is an application portion to which the sealant is applied, and the application portion is recessed or step-shaped.

5. The developer container according to claim 4, wherein the adhesion portion bonded to the application portion that is recessed is projection-shaped.

6. The developer container according to claim 4, wherein the application portion that is recessed is disposed adjacent to another application portion that is step-shaped.

7. The developer container according to claim 1, wherein the seal contacts the sealant.

8. The developer container according to claim 7, wherein the seal includes a cutout portion, and the sealant is applied to an area next to the cutout portion.

9. The developer container according to claim 8, wherein one of the adhesion portion of the first component and the adhesion portion of the second component is a recessed application portion to which the sealant is applied, and the recessed application portion is disposed adjacent to an attachment portion to which the seal is attached.

10. The developer container according to claim 9, wherein a head of the cutout portion is attached to an end surface of a side wall of the recessed application portion.

11. The developer container according to claim 7, further comprising a rotator,
wherein the seal contacts the rotator.

12. The developer container according to claim 1, wherein the first position regulator is disposed in a vicinity of the adhesion portion of the first component.

13. The developer container according to claim 1, wherein the first position regulator is projection-shaped and projects from an application surface to which the sealant is applied.

14. A developing device comprising:
    a developer bearer to bear a developer, rotate, and develop a latent image on an image bearer; and
    the developer container according to claim 1, to store the developer.

15. An image forming apparatus comprising:
    an image bearer to bear a latent image;
    a developing device to develop the latent image on the image bearer with a developer; and
    the developer container according to claim 1, to store the developer.

16. The developer container of claim 7, wherein the seal contacts the sealant at a cutout portion.

17. A developing device, comprising:
    a developer bearer to bear a developer, rotate, and develop a latent image on an image bearer; and
    the developer container according to claim 1, to store the developer.

18. An image forming apparatus, comprising:
    an image bearer to bear a latent image;
    a developing device to develop the latent image on the image bearer with a developer; and
    the developer container according to claim 1, to store the developer.

19. An image forming apparatus, comprising:
    an image bearer to bear a latent image;
    a developing device to develop the latent image on the image bearer with a developer; and
    the developer container according to claim 8, to store the developer.

20. A developer container prepared by a process comprising:
    applying a sealant to a first component of a plurality of components to be combined together to form a space to store a developer, the plurality of components including the first component and a second component; and
    bonding the first component to which the sealant was applied and the second component to form the developer container, the developer container including a first position regulator to regulate relative positions of the first component and the second component so as to maintain a distance between an adhesion portion of the first component and an adhesion portion of the second component, a second position regulator to prevent the first component from separating from the second component, and a seal, wherein the seal is elastically deformed to seal between the first component and the second component.

* * * * *